(12) United States Patent
Agarwal et al.

(10) Patent No.: US 8,516,222 B1
(45) Date of Patent: *Aug. 20, 2013

(54) VIRTUAL ARCHITECTURES IN A PARALLEL PROCESSING ENVIRONMENT

(75) Inventors: Anant Agarwal, Weston, MA (US); David Wentzlaff, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/315,766

(22) Filed: Dec. 9, 2011

Related U.S. Application Data

(60) Continuation of application No. 12/128,073, filed on May 28, 2008, now Pat. No. 8,078,832, which is a division of application No. 11/414,421, filed on Apr. 28, 2006, now Pat. No. 7,734,895.

(60) Provisional application No. 60/675,612, filed on Apr. 28, 2005.

(51) Int. Cl.
| | |
|---|---|
| G06F 15/00 | (2006.01) |
| G06F 15/76 | (2006.01) |
| G06F 9/30 | (2006.01) |
| G06F 9/40 | (2006.01) |
| G06F 7/38 | (2006.01) |
| G06F 9/00 | (2006.01) |
| G06F 9/44 | (2006.01) |
| G06F 9/45 | (2006.01) |
| G06F 9/46 | (2006.01) |

(52) U.S. Cl.
USPC .......... 712/13; 712/10; 712/15; 712/213; 712/235; 717/136; 718/104

(58) Field of Classification Search
None
See application file for complete search history.

(56) References Cited

U.S. PATENT DOCUMENTS

| | | |
|---|---|---|
| 5,404,550 A | 4/1995 | Horst |
| 5,574,873 A | 11/1996 | Davidian |
| 5,710,938 A | 1/1998 | Dahl et al. |
| 5,900,022 A | 5/1999 | Kranich et al. |
| 5,930,495 A | 7/1999 | Christopher et al. |
| 6,058,466 A | 5/2000 | Panwar et al. |
| 6,101,599 A | 8/2000 | Wright et al. |
| 6,430,670 B1 | 8/2002 | Bryg et al. |
| 6,480,952 B2 | 11/2002 | Gorishek et al. |
| 6,587,938 B1 | 7/2003 | Eilert et al. |
| 6,606,704 B1 | 8/2003 | Adiletta et al. |

(Continued)

FOREIGN PATENT DOCUMENTS

| | | |
|---|---|---|
| WO | WO 2004/072796 | 8/2004 |

OTHER PUBLICATIONS

Agarwal, Anant. "Raw Computation," *Scientific American* vol. 281, No. 2: 44-47, Aug. 1999.

(Continued)

*Primary Examiner* — Andrew Caldwell
*Assistant Examiner* — William B Partridge
(74) *Attorney, Agent, or Firm* — Fish & Richardson P.C.

(57) ABSTRACT

An integrated circuit includes a plurality of processor core. Processing instructions in the integrated circuit includes: managing a plurality of sets of processor cores, each set including one or more processor cores assigned to a function associated with executing instructions; and reconfiguring the number of processor cores assigned to at least one of the sets during execution based on characteristics associated with executing the instructions.

33 Claims, 7 Drawing Sheets

(56) References Cited

U.S. PATENT DOCUMENTS

| | | | |
|---|---|---|---|
| 6,633,916 | B2 | 10/2003 | Kauffman |
| 6,704,925 | B1 | 3/2004 | Bugnion |
| 6,751,583 | B1 | 6/2004 | Clarke et al. |
| 6,799,263 | B1 | 9/2004 | Morris et al. |
| 6,820,255 | B2 | 11/2004 | Babaian et al. |
| 7,140,020 | B2 | 11/2006 | McCarthy et al. |
| 7,394,288 | B1 | 7/2008 | Agarwal |
| 7,461,236 | B1 | 12/2008 | Wentzlaff |
| 7,734,895 | B1 * | 6/2010 | Agarwal et al. ............ 712/13 |
| 7,739,434 | B2 | 6/2010 | Farrell et al. |
| 2002/0029308 | A1 | 3/2002 | Babaian et al. |
| 2002/0065992 | A1 | 5/2002 | Chauvel et al. |
| 2002/0092002 | A1 | 7/2002 | Babaian et al. |
| 2003/0200418 | A1 | 10/2003 | DeHon et al. |
| 2004/0015888 | A1 | 1/2004 | Fujii et al. |
| 2004/0024953 | A1 | 2/2004 | Babaian et al. |
| 2004/0044880 | A1 | 3/2004 | Altman et al. |
| 2005/0235270 | A1 | 10/2005 | Sanyal |
| 2006/0184766 | A1 | 8/2006 | Pires Dos Reis Moreira |
| 2008/0126755 | A1 | 5/2008 | Wu et al. |

OTHER PUBLICATIONS

Taylor, Michael Bedford et. al., "Evaluation of the Raw Microprocessor: An Exposed-Wire-Delay Architecture for ILP and Streams," *Proceedings of International Symposium on Computer Architecture*, Jun. 2004.

Taylor, Michael Bedford et. al., "Scalar Operand Networks: On-Chip Interconnect for ILP in Partitioned Architectures," *Proceedings of the International Symposium on High Performance Computer Architecture*, Feb. 2003.

Taylor, Michael Bedford et. al., "A 16-Issue Multiple-Program-Counter Microprocessor with Point-to-Point Scalar Operand Network," *Proceedings of the IEEE International Solid-State Circuits Conference*, Feb. 2003.

Taylor, Michael Bedford et. al., "The Raw Microprocessor: A Computational Fabric for Software Circuits and General-Purpose Programs," *IEEE Micro*, pp. 25-35, Mar.-Apr. 2002.

Lee, Walter et. al., "Space-Time Scheduling of Instruction-Level Parallelism on a Raw Machine," *Proceedings of the Eighth International Conference on Architectural Support for Programming Languages and Operating Systems (ASPLOS-VIII)*, San Jose, CA, Oct. 4-7, 1998.

Kim, Jason Sungtae et. al., "Energy Characterization of a Tiled Architecture Processor with On-Chip Networks," *International Symposium on Low Power Electronics and Design*, Seoul, Korea, Aug. 25-27, 2003.

Barua, Rajeev et. al., "Compiler Support for Scalable and Efficient Memory Systems," *IEEE Transactions on Computers*, Nov. 2001.

Waingold, Elliot et. al., "Baring it all to Software: Raw Machines," *IEEE Computer*, pp. 86-93, Sep. 1997.

Lee, Walter et. al., "Convergent Scheduling," *Proceedings of the 35th International Symposium on Microarchitecture*, Istanbul, Turkey, Nov. 2002.

Wentzlaff, David and Anant Agarwal, "A Quantitative Comparison of Reconfigurable, Tiled, and Conventional Architectures on Bit-Level Computation," *MIT/LCS Technical Report LCS-TR-944*, Apr. 2004.

Suh, Jinwoo et. al., "A Performance Analysis of PIM, Stream Processing , and Tiled Processing on Memory-Intensive Signal Processing Kernels," *Proceedings of the International Symposium on Computer Architecture*, Jun. 2003.

Barua, Rajeev et. al., "Maps: A Compiler-Managed Memory System for Raw Machines," *Proceedings of the Twenty-Sixth International Symposium on Computer Architecture (ISCA-26)*, Atlanta, GA, Jun. 1999.

Barua, Rajeev et. al., "Memory Bank Disambiguation using Modulo Unrolling for Raw Machines," *Proceedings of the Fifth International Conference on High Performance Computing*, Chennai, India, Dec. 17-20, 1998.

Agarwal, A. et. al., "The Raw Compiler Project," *Proceedings of the Second SUIF Compiler Workshop*, Stanford, CA, Aug. 21-23, 1997.

Taylor, Michael Bedford et. al., "Scalar Operand Networks," *IEEE Transactions on Parallel and Distributed Systems (Special Issue on On-Chip Networks)*, Feb. 2005.

Taylor, Michael. The Raw Prototype Design Document V5.01 [online]. Department of Electrical Engineering and Computer Science, Massachusetts Institute of Technology, Sep. 6, 2004 [retrieved on Sep. 25, 2006]. Retrieved from the Internet: <ftp://ftp.cag.lcs.mit.edu/pub/raw/documents/RawSpec99.pdf>.

Moritz, Csaba Andras et. al., "Hot Pages: Software Caching for Raw Microprocessors," *MIT/LCS Technical Memo LCS-TM-599*, Aug. 1999.

K. Ebcioglu and E. R. Altman, "DAISY: Dynamic compilation for 100% architectural compatibility," in *Proceedings of the International Symposium on Computer Architecture*, Jun. 1997, pp. 26-37.

M. Gschwind, M. et al., "Dynamic and Transparent Binary Translation." *IEEE Computer*, vol. 33, No. 3, pp. 54-59, Mar. 2000.

Hauck, S. et al., "The Chimaera Reconfigurable Functional Unit." in *Proceedings of the IEEE Symposium on Field-Programmable Custom Computing Machines*, Apr. 1997, pp. 87-96.

Bolotski, M. et al., "Unifying FPGAs and SIMD Arrays." in *Proceedings of the International Workshop on Field-Programmable Gate Arrays*, Feb. 1994, MIT Transit Note No. 95.

Callahan, T. J. et al., "The Garp Architecture and C Compiler." *IEEE Computer*, vol. 33, No. 4, pp. 62-69, Apr. 2000.

Razdan, R. and M. D. Smith, "A High-Performance Microarchitecture with Hardware-Programmable Functional Units." in *Proceedings of the International Symposium on Microarchitecture*, Nov. 1994, pp. 172-180.

Dehnert, J.C. et al., "The Transmeta Code Morphing Software: Using Speculation, Recovery, and Adaptive Retranslation to Address Real-Life Challenges." in *Proceedings of the International Symposium on Code Generation and Optimization*, Mar. 2003, pp. 15-24.

\* cited by examiner

VIRTUAL ARCHITECTURES IN A PARALLEL PROCESSING ENVIRONMENT

BACKGROUND

The invention relates to integrated circuits (ICs), and more particularly to virtual architectures in a parallel processing environment.

STATEMENT AS TO FEDERALLY SPONSORED RESEARCH

This invention was made with government support under Grant Number NBCH1040009 awarded by Defense Advanced Research Projects Agency (DARPA). The government has certain rights in the invention.

CROSS-REFERENCE TO RELATED APPLICATIONS

This application is a continuation of U.S. application Ser. No. 12/128,073, filed May 28, 2008 (which will issue as U.S. Pat. No. 8,078,832), which is a divisional application of U.S. application Ser. No. 11/414,421, filed Apr. 28, 2006 (which issued as U.S. Pat. No. 7,734,895), and this application claims the benefit of U.S. Provisional Application No. 60/675,612, filed Apr. 28, 2005, each of which is incorporated herein by reference.

FPGAs (Field Programmable Gate Arrays) and ASICs (Application Specific Integrated Circuits) are two exemplary approaches for implementing customized logic circuits. An ASIC is designed for a specific application. The cost of building an ASIC includes the cost of verification, the cost of physical design and timing closure, and the NRE (non-recurring costs) of creating mask sets and fabricating the ICs. Due to the increasing costs of building an ASIC, FPGAs became increasingly popular in the late 1990's. Unlike an ASIC, an FPGA is reprogrammable in that it can be reconfigured for each application. Similarly, as protocols change, an FPGA design can be changed even after the design has been shipped to customers, much like software can be updated. However, FPGAs are typically more expensive, often costing 10 to 100 times more than an ASIC. FPGAs are typically power hungry and their performance can be 10 to 20 times worse than that of an ASIC.

The Massachusetts Institute of Technology (MIT) Raw integrated circuit design provides reconfigurability of an FPGA along with the performance and capability of an ASIC. The Raw design is an example of a tiled integrated circuit providing a computational substrate as described for example, in "Baring It All to Software: RAW Machines" IEEE Computer, September 1997, pp. 86-93. The Raw design can be used to exploit fine-grained Instruction-Level Parallelism (ILP) in a program to execute the program using the parallel processing resources of the integrated circuit.

In some processor architectures, such as a Very Long Instruction Word (VLIW) processor architecture, applications such as dynamic translation of instructions from one instruction set architecture to another can exploit ILP to map translated code across parallel resources of the VLIW, increasing translation speed. However, this fine-grained parallelism does not necessarily enable the application to use the parallel resources for a more coarse-grained division of the application functions across the computational substrate.

SUMMARY

In one aspect, in general, the invention features a method for processing instructions in an integrated circuit, the integrated circuit comprising a plurality of processor cores, the method comprising: managing a plurality of sets of processor cores, each set including one or more processor cores assigned to a function associated with executing instructions; and reconfiguring the number of processor cores assigned to at least one of the sets during execution based on characteristics associated with executing the instructions.

Aspects of the invention can include one or more of the following features.

A first function associated with a first set comprises translating instructions.

Translating the instructions comprises translating instructions of a guest instruction set architecture into instructions of a host instruction set architecture native to the processor cores.

The guest instruction set architecture corresponds to a type selected from the group consisting of: x86 (i.e., Intel® Architecture processors, including the Intel1286®, Intel1386®, Intel1486®, Pentium® processors), PowerPC®, SPARC®, Alpha®, ARM®, ARC®, Sharc® DSP, TI® DSP, MIPS®, Java® bytecode, and MSIL®.

The method further comprises reserving at least one processor core in the first set for translating a block of instructions in response to a request from a processor core executing translated instructions.

The method further comprises preempting a processor core in the first set that is translating a first block of instructions in response to a request to translate a second block of instructions from a processor core executing translated instructions.

The method further comprises storing instructions translated by processor cores in the first set in a cache.

Storing instructions in the cache comprises storing the instructions in one of a plurality of processor cores providing memory for the cache.

A second function associated with a second set comprises storing cached data.

A first function associated with a first set comprises storing cached data.

A memory management processor core translates virtual addresses associated with instructions to be executed into physical addresses to be handled by processor cores in the first set.

Reconfiguring the number of processor cores assigned to the first set comprises reassigning processor cores to or from the first set according to hysteresis characterizing a parameter associated with at least one of the sets.

Reconfiguring the number of processor cores assigned to at least one of the sets comprises reassigning a processor core from a first set associated with a first function to a second set associated with a second function.

Reconfiguring the number of processor cores assigned to a first set comprises reassigning processor cores based on a cache miss rate associated with executing the instructions.

The cache miss rate is associated with a cache for instructions translated by processor cores in the first set.

The cache miss rate is associated with a cache for data stored in processor cores in the first set.

Reconfiguring the number of processor cores assigned to a first set comprises reassigning processor cores based on instruction level parallelism characterizing the instructions.

Reassigning processor cores comprises selecting a number of processor cores to execute a number of operations in parallel according to a data parallel instruction to be executed.

The data parallel instruction comprises a single instruction multiple data instruction or a vector instruction.

Reconfiguring the number of processor cores assigned to a first set comprises reassigning processor cores based on a quantity of work assigned to the processor cores in the first set.

The quantity of work comprises a number of basic blocks of instructions waiting to be translated by the processor cores in the first set.

At least one of the processor cores is in more than one of the sets to perform the corresponding functions multiplexed in time.

In another aspect, in general, the invention features an integrated circuit, comprising: a plurality of sets of processor cores interconnected by an interconnection network, each set including one or more processor cores configured to execute host instructions according to a function associated with executing guest instructions; and at least one processor core configured to execute host instructions to reconfigure the number of processor cores in at least one of the sets during execution of the guest instructions based on characteristics associated with executing the guest instructions.

Aspects of the invention can include one or more of the following features.

A first set of processor cores comprises processor cores configured to execute host instructions to translate guest instructions into host instructions, the host instructions corresponding to a host instruction set architecture native to the processor cores.

At least one processor core is configured to access a cache for host instructions translated by processor cores in the first set.

Wherein the cache comprises memory in at least one processor core.

The cache comprises memory coupled to at least one processor core.

A first set of processor cores comprises processor cores, each configured to execute host instructions to store cached data in a memory within the respective processor core.

A memory management processor core includes a translation lookaside buffer to translate virtual addresses associated with instructions to be executed into physical addresses to be handled by processor cores in the first set.

Each of the plurality of processor cores corresponds to a tile on the integrated circuit, each tile comprising: a computation unit; and a switch including switching circuitry to forward data received over data paths of the interconnection network from other tiles to the computation unit and to switches of other tiles, and to forward data received from the computation unit to switches of other tiles.

The computation unit comprises a pipelined processor and the switch is coupled to a plurality of pipeline stages of the pipelined processor.

At least one port of the switch is mapped to a register name space of the pipelined processor.

In another aspect, in general, the invention features a method for configuring an integrated circuit, the integrated circuit comprising a plurality of processor cores, the method comprising: configuring a plurality of sets of processor cores, each set including one or more processor cores assigned to a function associated with executing instructions; and selecting the number of processor cores assigned to at least one of the sets based on characteristics of a program to be executed on the integrated circuit.

Aspects of the invention can include one or more of the following features.

A first function associated with a first set comprises translating instructions.

Translating the instructions comprises translating instructions of a guest instruction set architecture into instructions of a host instruction set architecture native to the processor cores.

A first function associated with a first set comprises storing cached data.

In another aspect, in general, the invention features a method for processing instructions in an integrated circuit, the integrated circuit comprising a plurality of processor cores, the method comprising: assigning blocks of instructions to a set of one or more processor cores to translate the instructions into translated instructions, the blocks of instructions being associated with an execution order; and providing at least one execution processor core to execute translated instructions while the set of one or more processor cores are translating instructions that occur later in the execution order than instructions corresponding to the translated instructions being executed.

Aspects of the invention can include one or more of the following features.

Assigning blocks of instructions comprises assigning blocks of instructions based on branches between different blocks of instructions.

The set of processor cores comprises a plurality of processor cores, and assigning blocks of instructions comprises: determining a branch in control flow associated with instructions to be translated corresponding to multiple program paths; assigning a first block of instructions associated with a first path to a first processor core in the set; and assigning a second block of instructions associated with a second path to a second processor core in the set.

Translating the instructions comprises translating instructions of a guest instruction set architecture into instructions of a host instruction set architecture native to the processor cores.

The guest instruction set architecture corresponds to a type selected from the group consisting of: x86, PowerPC®, SPARC®, Alpha®, ARM®, ARC®, Sharc® DSP, TI® DSP, MIPS®, Java® bytecode, and MSIL®.

Translating the instructions comprises translating guest instructions into intermediate representation instructions, and generating host instructions based in the intermediate representation instructions.

The method further comprises optimizing intermediate representation instructions before generating corresponding host instructions.

The method further comprises optimizing generated host instructions.

The method further comprises optimizing translated instructions.

The method further comprises reserving at least one processor core in the set for translating a block of instructions in response to a request from the execution processor core.

The method further comprises preempting a processor core in the set that is translating a first block of instructions in response to a request to translate a second block of instructions from the execution processor core.

The method further comprises storing instructions translated by processor cores in the set in a cache.

Storing instructions in the cache comprises storing the instructions in one of a plurality of processor cores providing memory for the cache.

In another aspect, in general, the invention features an integrated circuit, comprising: at least one processor core configured to assign blocks of instructions to a set of one or more processor cores to translate the instructions into translated instructions, the blocks of instructions being associated with an execution order; and at least one processor core to execute translated instructions while the set of one or more processor cores are translating instructions that occur later in the execution order than instructions corresponding to the translated instructions being executed.

Aspects of the invention can include one or more of the following features.

The integrated circuit further comprises a set of one or more scheduling processor cores configured to schedule the translated instructions for execution.

The integrated circuit further comprises a set of one or more processor cores configured to perform register renaming according to instructions received from the scheduling processor cores.

The integrated circuit further comprises a set of one or more reservation station processor cores configured to store translated instructions until the translated instructions are ready to be executed.

The integrated circuit further comprises a set of multiple processor cores configured to execute the translated instructions received from the set of one or more reservation station processor cores.

The integrated circuit further comprises a set of one or more reordering processor cores configured to manage a reorder buffer for storing results until corresponding executed instructions are ready to be retired.

Each of the plurality of processor cores corresponds to a tile on the integrated circuit, each tile comprising: a computation unit; and a switch including switching circuitry to forward data received over data paths of the interconnection network from other tiles to the computation unit and to switches of other tiles, and to forward data received from the computation unit to switches of other tiles.

The computation unit comprises a pipelined processor and the switch is coupled to a plurality of pipeline stages of the pipelined processor.

At least one port of the switch is mapped to a register name space of the pipelined processor.

In another aspect, in general, the invention features a method for emulating a guest instruction set architecture on an integrated circuit, the integrated circuit comprising a plurality of processor cores associated with a host instruction set architecture, the method comprising: receiving guest instructions of the guest instruction set architecture; running each of a plurality of host processes on a respective set of one or more processor cores, each of the host processes including instructions of the host instruction set architecture; and providing results of a first of the host processes to a second of the host processes to execute the guest instructions.

Aspects of the invention can include one or more of the following features.

The first and second host processes communicate according to a pipeline in which the first host process performs a first function with respect to a first set of one or more guest instructions, and the second host process performs a second function with respect to a second set of one or more guest instructions that occur earlier than the first set of guest instructions in an execution order associated with the guest instructions.

Providing results of the first host process to the second host process comprises storing the results in a memory accessible to the first host process and the second host process.

Providing results of the first host process to the second host process comprises transmitting the results over an interconnection network from a processor core corresponding to the first host process to a processor core corresponding to the second host process.

Executing the guest instructions comprises translating guest instructions into host instructions using one or more of the host processes.

At least one of the host processes manages a cache for translated host instructions.

At least one of the host processes manages a cache for data associated with executing the guest instructions.

Each of the host processes comprises a high-level language program compiled into instructions of the host instruction set architecture.

Each of the host processes corresponds to a function performed in hardware of an integrated circuit architecture natively supporting the guest instruction set architecture.

A first of the functions comprises performing operations of arithmetic logic unit or a floating point unit.

The functions are functions selected from the group consisting of: an instruction issue function, a register rename function, an execution unit function, a cache coherence function, a prefetch function, a branch prediction function, a memory prefetch function, an instruction fetch function, an interrupt handling function, a translation lookaside buffer function, a condition code handling function, and an instruction decode function.

The method further comprises receiving host instructions of the host instruction set architecture; and executing the received host instructions natively on a set of one or more processor cores.

The method further comprises communicating between the set of one or more processor cores executing the host instructions and at least one set of one or more processor cores executing the guest instructions.

Aspects of the invention can have one or more of the following advantages.

Parallel resources can be used to facilitate execution of legacy programs (using a "guest" instruction set architecture) with acceptable performance on parallel architectures using a different "host" instruction set architecture (ISA) through the use of parallel dynamic binary translation in a parallel processing environment. For example, an integrated circuit with multiple computation elements (e.g., interconnected processor cores or a tiled array of processors) can spatially implement different portions of a superscalar processor across distinct parallel computation elements thus exploiting the pipeline parallelism inherent in a superscalar processor. This virtual microarchitecture facilitates changing the allocation of silicon resources between different superscalar units in software, which may not be possible when special purpose physical resources are used to build a microarchitecture. Dynamically reconfigurable architectures are able to inspect the current virtual machine configuration along with the dynamic instruction stream and change the configuration to best suit a program's needs at runtime. Dynamic reconfiguration of microarchitectures can be used for dynamic binary translation, processor emulation, or other types of processing applications. Examples of virtual architectures are described in the context of a tiled integrated circuit architecture (e.g., the Raw processor design). An x86 to Raw parallel translation system in which tiles assigned to translation can be traded for tiles assigned to the memory system provides an example of dynamic reconfiguration.

Other features and advantages of the invention will become apparent from the following description, and from the claims.

DESCRIPTION

1 Tiled Circuit Architecture Overview

Figure 1:
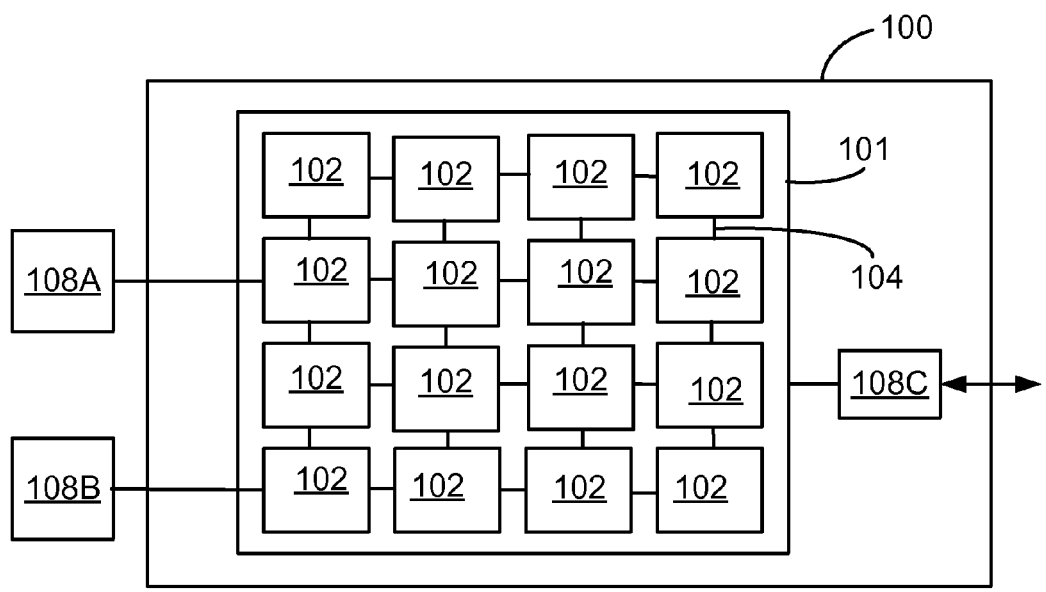
FIG. 1 is a block diagram of a tiled integrated circuit.

Referring to FIG. 1, an integrated circuit 100 (or "chip") includes an array 101 of interconnected tiles 102. Each of the tiles 102 includes a processor (or "processor core") and a switch that forwards data from other tiles to the processor and to switches of other tiles over data paths 104. In each tile, the switch is coupled to the processor so that data can be sent to or received from processors of other tiles. The integrated circuit 100 includes other on-chip circuitry such as input/output (I/O) interface circuitry to couple data in and out of the circuit 100, and clock distribution circuitry to provide clock signals to the processors of the tiles.

The example of the integrated circuit 100 shown in FIG. 1 includes a two-dimensional array 101 of rectangular tiles with data paths 104 between neighboring tiles to form a mesh network. The data path 104 between any two tiles can include multiple "wires" (e.g., serial, parallel or fixed serial and parallel signal paths on the integrated circuit 100) to support parallel channels in each direction. Optionally, specific subsets of wires between the tiles can be dedicated to different mesh networks that can operate independently. In some examples, the network includes paths that extend to diagonal neighbors or to tiles that are multiple rows or columns away. Other examples include higher dimensional mesh topologies. For example, multiple layered integrated circuits or other three-dimensional configurations can be used to form networks in which the connections form a cube of network nodes.

The data paths 104 from one or more tiles at the edge of the network can be coupled out of the array of tiles 101 (e.g., over I/O pins) to an on-chip device 108A, an off-chip device 108B, or a communication channel interface 108C, for example. Multiple wires of one or more parallel channels can be multiplexed down to a fewer number of pins or to a serial channel interface. For example, the wires for one or more channels can be multiplexed onto a high-speed serial link (e.g., SerDes, SPIE4-2, or SPIE5) or a memory controller interface (e.g., a memory controller for Double Data Rate (DDR) or Quad Data Rate (QDR) Static Random Access Memory (SRAM), or Dynamic RAM (DRAM)). The memory controller can be implemented, for example, off-chip or in logic blocks within a tile or on the periphery of the integrated circuit 100.

The following exemplary implementations are described in the context of tiles that each have the same structure and functionality. Alternatively there can be multiple "tile types" each having different structure and/or functionality. For example, tiles that couple data off of the integrated circuit 100 can include additional circuitry for I/O functions. Tiles are not necessarily arranged in a regular rectilinear array.

Figure 2A:
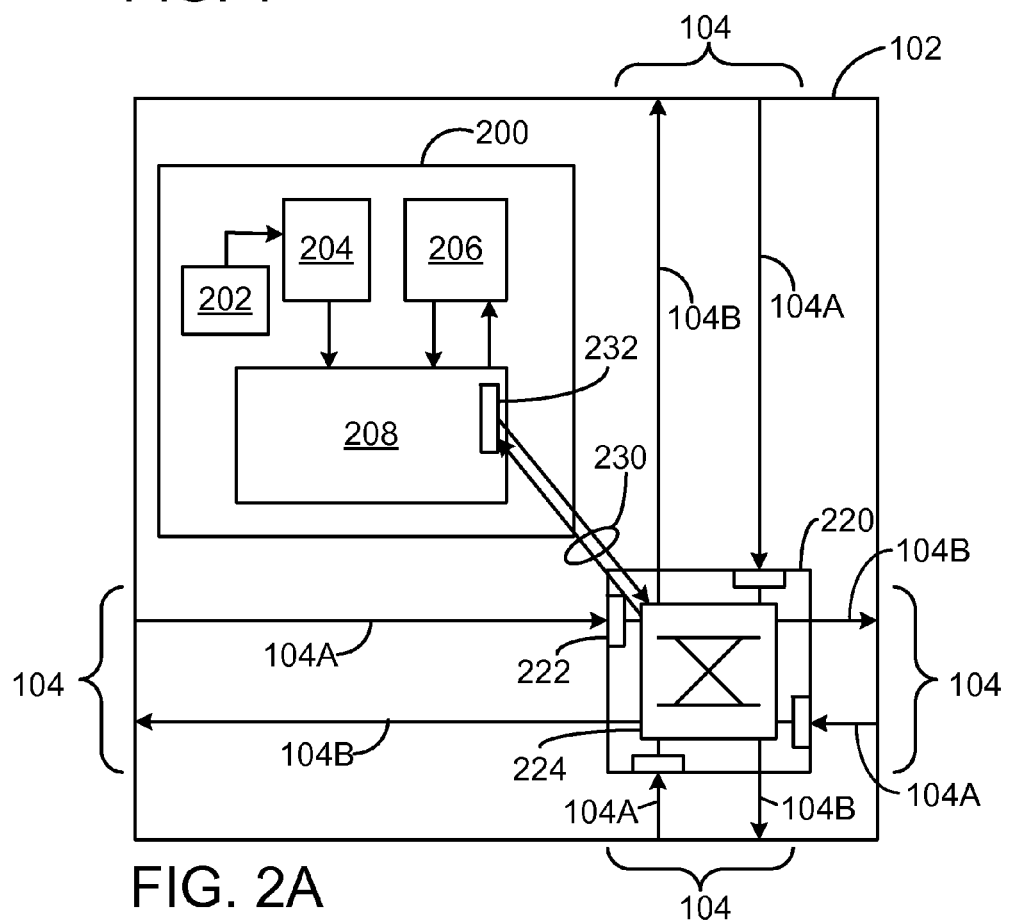
FIG. 2A is a block diagram of a tile.

Referring to FIG. 2A, a tile 102 includes a processor 200, a switch 220, and sets of incoming wires 104A and outgoing wires 104B that form the data paths 104 for communicating with neighboring tiles. The processor 200 includes a program counter 202, an instruction memory 204, a data memory 206, and a pipeline 208. Either or both of the instruction memory 204 and data memory 206 can be configured to operate as a cache for off-chip memory. In some implementations, the instruction memory 204 and data memory 206 are both stored in portions of an on-tile memory or cache coupled to the processor 200. The processor 200 can use any of a variety of pipelined architectures. The pipeline 208 includes pipeline registers, functional units such as one or more arithmetic logic units (ALUs), and temporary storage such as a register file. The stages in the pipeline 208 include, for example, instruction fetch and decode stages, a register fetch stage, instruction execution stages, and a write-back stage. Whether the pipeline 208 includes a single ALU or multiple ALUs, an ALU can be "split" to perform multiple operations in parallel. For example, if the ALU is a 32-bit ALU it can be split to be used as four 8-bit ALUs or two 16-bit ALUs. The processor 200 can include other types of functional units such as a multiply accumulate unit, or a vector unit. The processor 200 can be multithreaded and/or have capabilities of a Very Long Instruction Word (VLIW) processor, a superscalar processor, or a vector processor.

The switch 220 includes input buffers 222 for temporarily storing data arriving over incoming wires 104A, and switching circuitry 224 (e.g., a crossbar fabric) for forwarding data to outgoing wires 104B or the processor 200. The input buffering provides pipelined data channels in which data traverses a path 104 from one tile to a neighboring tile in predetermined number of clock cycles (e.g., a single clock cycle). This pipelined data transport enables the integrated circuit 100 to be scaled to a large number of tiles without needing to limit the clock rate to account for effects due to wire lengths such as propagation delay or capacitance. (Alternatively, the buffering could be at the output of the switching circuitry 224 instead of, or in addition to, the input.)

1.1 Switch Operation

Continuing to refer to FIG. 2A, a tile 102 controls operation of a switch 220 using either the processor 200, or separate switch processor dedicated to controlling the switching circuitry 224. Separating the control of the processor 200 and the switch 220 allows the processor 200 to take arbitrary data dependent branches without necessarily disturbing the routing of independent messages passing through the switch 220.

In some implementations, the switch 220 includes a switch processor that receives a stream of switch instructions for determining which input and output ports of the switching circuitry to connect in any given cycle. For example, the switch instruction includes a segment or "subinstruction" for each output port indicating to which input port it should be connected. In some implementations, the processor 200 receives a stream of compound instructions with a first instruction for execution in the pipeline 208 and a second instruction for controlling the switching circuitry 224.

The switch instructions enable efficient communication among the tiles for communication patterns that are known at compile time. This type of routing is called "static routing." An example of data that would typically use static routing are operands of an instruction to be executed on a neighboring processor.

The switch 220 also provides a form of routing called "dynamic routing" for communication patterns that are not necessarily known at compile time. In dynamic routing, circuitry in the switch 220 determines which input and output ports to connect based on the data being dynamically routed (e.g., in header information in the data). A tile can send a message to any other tile by generating the appropriate address information in the message header. The tiles along the route between the source and destination tiles use a predetermined routing approach (e.g., shortest Manhattan Routing).

The number of hops along a route is deterministic but the latency depends on the congestion at each tile along the route. Examples of data traffic that would typically use dynamic routing are memory access traffic (e.g., to handle a cache miss) or interrupt messages.

The dynamic network messages can use fixed length messages, or variable length messages whose length is indicated in the header information. Alternatively, a predetermined tag can indicate the end of a variable length message. Variable length messages reduce fragmentation.

The switch 220 can include dedicated circuitry for implementing each of these static and dynamic routing approaches. For example, each tile has a set of data paths, buffers, and switching circuitry for static routing, forming a "static network" for the tiles; and each tile has a set of data paths, buffers, and switching circuitry for dynamic routing, forming a "dynamic network" for the tiles. In this way, the static and dynamic networks can operate independently. A switch for the static network is called a "static switch"; and a switch for the dynamic network is called a "dynamic switch." There can also be multiple static networks and multiple dynamic networks operating independently. For example, one of the dynamic networks can be reserved as a memory network for handling traffic between tile memories, and to/from on-chip or off-chip memories. Another network may be reserved for data associated with a "supervisory state" in which certain actions or resources area reserved for a supervisor entity.

As described above, the switch 220 is coupled to the processor 200 over processor coupling wires 230. For fast (e.g., low latency) communication between tiles of neighboring processors, the coupling wires 230 can be integrated directly into the pipeline 208. The processor 200 can communicate with the switch 220 using distinct opcodes to distinguish between accesses to the static and dynamic network ports. Alternatively, the instructions can use register names to refer to switch ports.

For example, the processor can send or receive data by writing to or reading from a register interface that is directly mapped to the input buffers 222 of the switch 220. For data going to or coming from the processor 200, a switch instruction indicates that the switch 220 should couple data to or from a selected register or bypass path of the pipeline 208 over a register mapped pipeline integrated switch interface 232. This pipeline integration allows data to be available to the switch 200 the moment an instruction is executed and the register value is available. In the next cycle the same data could appear at an input buffer of another tile.

Figure 2B:
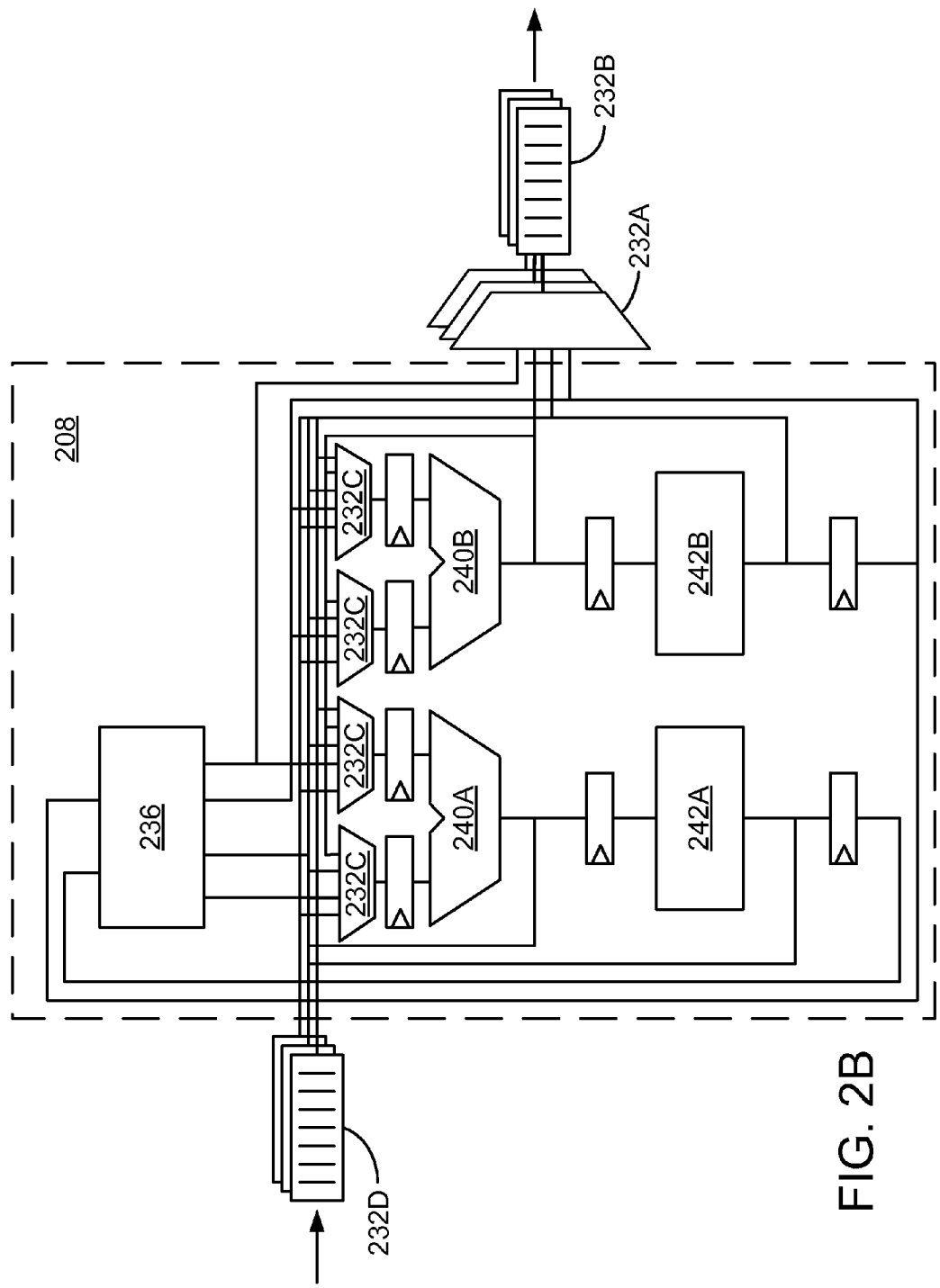
FIG. 2B is a block diagram of a pipeline integrated switch interface.

Referring to FIG. 2B, a register mapped pipeline integrated switch interface 232 (FIG. 2A) includes a set of multiplexers 232A and output buffers 232B coupled to different output ports of the static or dynamic switch. The switch interface also includes a set of multiplexers 232C that select data from a register file 236 or any of a set of input buffers 232D coupled to different input ports of the static or dynamic switch. The multiplexers 232C feed the inputs to logic units 240A and 240B. The output buffers 232B and input buffers 232D are mapped to the name space of the register file 236. When the processor 200 (FIG. 2A) reads from a register name mapped to a given switch port, data is taken from the corresponding input buffer 232D. When the processor 200 writes to a register name mapped to a given switch port, data is inserted into the corresponding output buffer 232B. The multiplexers 232A are able to select data from any pipeline stage (e.g., before or after the logic units 240A and 240B, or before or after functional units 242A and 242B) as soon as the value is available. If the processor 200 loads an instruction to read from an empty input buffer 232D or to write to a full output buffer 232B, the processor 200 will stall until it is able to proceed.

Figure 3A:
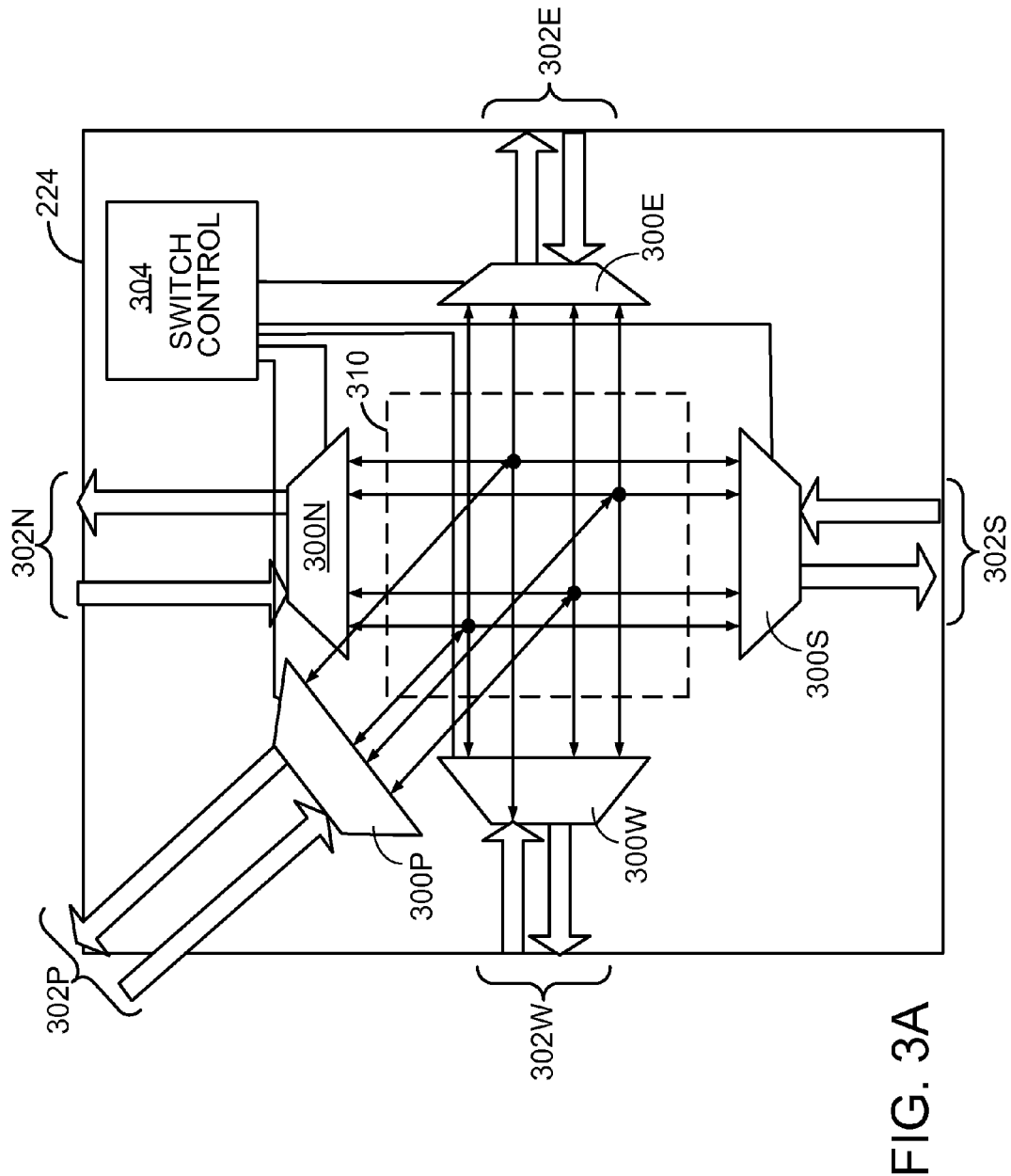
FIGS. 3A and 3B are block diagrams of switching circuitry.

Referring to FIG. 3A, switching circuitry 224 includes five multiplexers 300N, 300S, 300E, 300W, 300P for coupling to the north tile, south tile, east tile, west tile, and local processor 200, respectively. Five pairs of input and output ports 302N, 302S, 302E, 302W, 302P are connected by parallel data buses to one side of the corresponding multiplexer. The other side of each multiplexer is connected to the other multiplexers over a switch fabric 310. In alternative implementations, the switching circuitry 224 additionally couples data to and from the four diagonally adjacent tiles having a total of 9 pairs of input/output ports. Each of the input and output ports is a parallel port that is wide enough (e.g., 32 bits wide) to couple a data word between the multiplexer data bus and the incoming or outgoing wires 104A and 104B or processor coupling wires 230.

A switch control module 304 selects which input port and output port are connected in a given cycle. The routing performed by the switch control module 304 depends on whether the switching circuitry 224 is part of the dynamic network or static network. For the dynamic network, the switch control module 304 includes circuitry for determining which input and output ports should be connected based on header information in the incoming data.

Figure 3B:
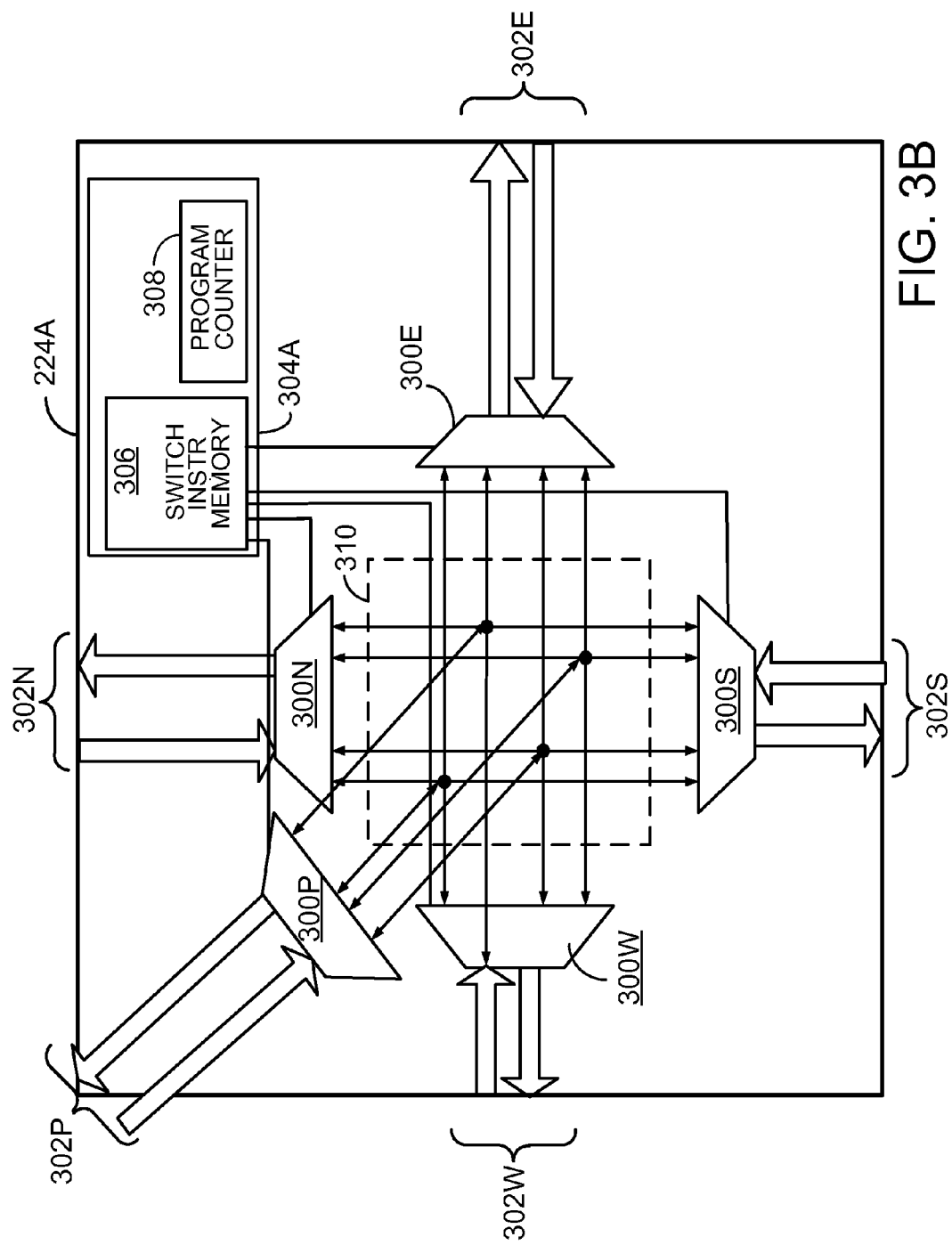

Referring to FIG. 3B, for the static network, the switch control module 304A of switching circuitry 224A includes a switch instruction memory 306 storing switch instructions that indicate which input and output ports should be connected. A switch instruction stored in the switch instruction memory 306 includes a subinstruction for each output port (in this case, five subinstructions). Each subinstruction represents a multiplexer select value which routes one of five input ports to the corresponding output port.

A program counter 308 steps through the switch instructions, interpreting control information (e.g., a condition code) in the switch instructions to perform actions such as branches or jumps based on program control flow. In a given clock cycle, the switch control module 304A can enable the multiplexers to move data independently onto any output port from any input port, including multicasting an input port to all output ports, as long as two input ports are not connected to the same output port in the same clock cycle.

The switch control module 304A is able to function as a switch processor with or without an ALU and registers. The switch control module 304A can include an ALU and registers to allow in-switch processing of in-flight messages. Optionally, the switch control module 304A can include other components such as a floating point arithmetic unit, or bit shifter, for example, to perform additional functions. In some examples, the switch control module 304A can be a VLIW-type processor and/or can be multithreaded.

The switches 220 include hardware and software mechanisms for providing flow control to ensure that data arriving at a full tile input buffer does not overwrite old data still pending in the buffer or cause deadlock. A switch 220 can include circuitry to detect full/empty states of buffers, and some of the wires in the data paths 104 of the static or dynamic network can be dedicated to communicating flow control information. In the dynamic network, the traffic patterns are unpredictable and there is a need for techniques for deadlock avoidance or deadlock detection and recovery. For example, buffers that become full can be overflowed into memory coupled to the switch 220 or the processor 200, or over one of the networks to off-chip memory. In the static network, the traffic patterns are controlled by the processing of switch instructions in a way that ensures correct delivery of data and avoids deadlock.

In a first approach to flow control for the static network, a processor 200 or switch 220 stalls if it is executing an instruction that attempts to read data from an empty input buffer 222 or from an empty processor output buffer 236, or send data to a tile with a full input buffer 222. This approach ensures correctness in the presence of timing variations introduced by dynamic events such as dynamic memory references and I/O operations.

In a second approach to flow control for the static network, the switch 220 can continue to process subinstructions of a macro switch instruction if data has arrived at the corresponding input buffers, and delay processing subinstructions if the corresponding input buffer is empty. The switch 220 is also notified that an input buffer at a connected tile that receives data from a given output port is full (e.g., via a full/empty bit). The switch 220 is able to continue processing switch instructions for other output ports while suspending only that output port.

In one implementation of this second approach, there is a switch instruction memory 306 (e.g., separate memory units or separate queues within a single memory unit) and program counter 308 for each output port to enable the switch 220 to operate independently on a separate stream of switch instructions for respective output ports. For example, the switch 220 can extract the instruction streams for respective output ports from an incoming macro switch instruction stream that includes subinstructions for the respective output ports. The condition code from a macro switch instruction can be included with each corresponding subinstruction of the extracted instruction streams. Alternatively, each subinstruction can include its own condition code based on the appropriate program logic. This second approach allows data that can be forwarded without sacrificing correctness to be forwarded without further delay.

1.2 Additional Circuitry

In some examples, a tile can include additional circuitry embedded within or coupled to the processor 200 and/or switch 220. The configuration of the circuitry in a tile can be controlled by local control information stored in the tile. For example, a module in the tile can be turned on or off or configured into a variety of modes based on the state of a "mode indicator" (e.g., one or more bits) stored in a register or other memory store.

A tile 102 can include various types of memory modules to serve as the instruction memory 204, data memory 206, or as a local memory store for other types of information such as control information for the tile. There can be a small SRAM bank in each tile in addition to a large SRAM bank. There can also be a larger DRAM bank in each tile. Each tile can have mode indicators used to select among these banks Any of the memory modules can be treated as a cache for a larger memory store outside the tile 102 or the integrated circuit 100. Such external memory (e.g., DRAM) is accessible over high bandwidth paths of one or more dynamic networks. The amount of memory can be chosen to roughly balance the areas devoted to processing and memory, and to match the memory access time and the processor clock.

A tile 102 can include Reconfigurable Logic (RL) that takes operands from registers and writes them back to registers after performing reconfigurable logic operations. The RL can be used for bit-level (or "gate-level") logic, and also for multi-bit-level (e.g., byte-level) logic. The operations performed by the RL can be specified by logic-level instructions supplied to the RL.

Functions such as virtual address translation, caching, global shared memory and memory protection can be implemented by any combination of hardware and software (e.g., processor instructions). A tile 102 can include a translation look-aside buffer (TLB) to translate virtual addresses as they come out of the processor 200 on each tile 102. A mode bit can turn off translation. The events such as cache miss or translation fault can trigger a trap or interrupt to the processor 200, so that the processor 200 can handle it in software. For example, there can be multiple trap lines to the processor 200. Alternatively, there are few trap lines, but there is a trap vector that the processor 200 can access which encodes the type of trap that occurred. There is a mode indicator which can allow selecting whether the software or the hardware handles these events. A hardware cache tag file can export a hit/miss status to the software rather than stalling the processor pipeline.

In a processor 200 in which the switch 220 is integrated into the bypass paths of the processor pipeline 208, the translation is performed before the data is sent (or committed) to the switch (e.g., before being written into a switch buffer to be sent out on any one of the static or dynamic networks). In this way, if there is a translation fault, then the data is not sent and the instruction can be safely aborted. Otherwise, data for which there has been a translation fault could corrupt program execution if sent over a network.

2 Tiled Circuit Programming Overview

A software system for the tiled integrated circuit 100 includes a compiler that is able to schedule instructions in both time and space by generating both processor and switch instructions for arranging the static network. The compiler can also prepare messages to be sent over the dynamic network. The combination of the static network and the pipeline integration enables the compiler to orchestrate a calculation to be performed over multiple tiles with fast register-level communication between tiles. The software system can exploit both coarse-grained parallelism and fine-grained Instruction-Level Parallelism (ILP). In addition, the software system can exploit reconfigurable logic in each tile to construct operations that are uniquely suited for a particular application. This reconfigurable logic can be coded in a hardware description language such as Verilog or VHDL, or in a high-level language such as C.

The operating system (OS) for the integrated circuit 100 can include a Linux-like kernel or a similar kernel running on a single tile 102. Alternatively, the OS can be a distributed OS running on multiple tiles sending messages to each of the processes on each of the tiles.

The compiler can leverage the architectural features of the integrated circuit 100 by partitioning and scheduling ILP or data-level parallelism across the tiles. The compiler is able to automatically parallelize sequential applications across multiple tiles 102. For example, outer loops can be parallelized at a coarse-grained while inner loops can be parallelized at a fine grain, much as in a vectorizing compiler. When the compiler can identify commonly occurring instruction patterns or bit operations, they can be configured into special operations that will run in a single cycle using the reconfigurable logic.

Figure 4:
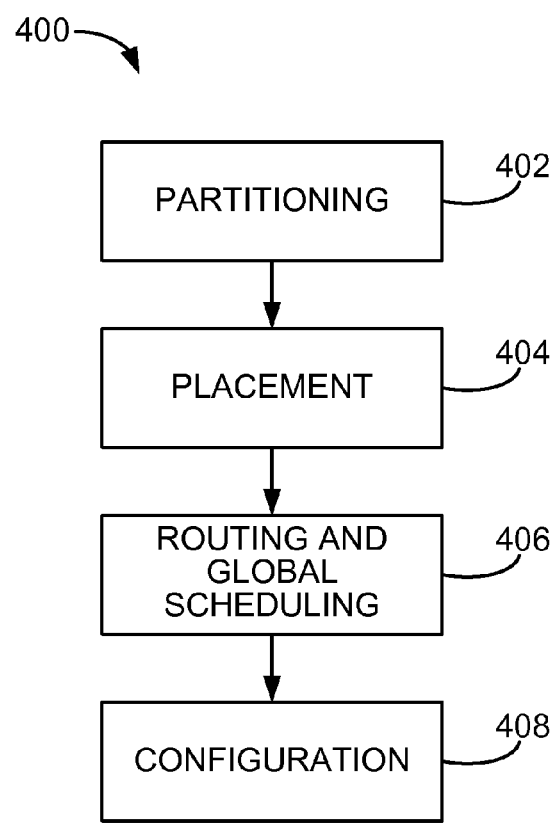
FIG. 4 is a flowchart for a compiling process.

Referring to FIG. 4, a compiling process 400 includes a number of stages. The compiler identifies and partitions for fine grain ILP in program by balancing the benefits of parallelism versus the overheads of communication and synchronization. In a partitioning phase 402, the compiler generates parallel code for a number of threads up to the number of tiles in the integrated circuit 100. In the partitioning phase 402, the compiler assumes an idealized fully-connected switch (an "ideal crossbar"), an unbounded number of virtual registers per tile, and symbolic data references. In a placement phase 404, the compiler removes the idealization of an ideal crossbar by selecting a one-to-one mapping from threads to physical tiles. The placement algorithm attempts to minimize a latency and bandwidth cost measure and can be, e.g., a variant of a VLSI cell placement algorithm. In a routing and global scheduling phase 406, the compiler allocates physical network resources with the goal of minimizing the overall estimated completion time of the program. The compiler output includes a program (e.g., a stream of instructions) for the processor 200 of each participating tile.

In an optional configuration phase 408, the compiler selects an application-specific configuration for reconfigurable logic to perform one or more custom operation. For each custom operation, the configuration compiler generates logic-level instructions for the reconfigurable logic and if necessary rewrites associated processor or switch instructions. For example, a compound operation involving multiple instructions is replaced by a call to the appropriate custom instruction using the reconfigurable logic. The compiler output includes a program (e.g., a stream of instructions) for each tile processor 200 and switch 220, and optional logic-level instructions.

Alternatively, the compiler can generate logic-level instructions based on a separate hardware description language program.

3 Virtual Architectures

Designs for integrated circuits that have multiple processors including on-chip parallel processors such as tiled integrated circuits, and other types of multi-core processors are able to effectively utilize the ever increasing silicon resources afforded to the computer architect. While these parallel architectures provide for large performance improvements over typical sequential processors, especially on parallel applications, they typically do not accelerate legacy sequential binary applications. In many cases, due to architectural mismatches such as differing instruction sets, lack of a memory management unit (MMU), non-coherent memory, differing I/O interfaces, and lack of operating system (OS) support, some on-chip parallel architectures may not be able to run legacy application binaries or intermediate codes or intermediate representations such as bytecodes directly.

One approach is to either recompile or recode legacy applications to take advantage of on-chip parallel architectures. In some cases, this may entail reverification of the legacy applications, and in some cases platform porting may not even be possible to some of the architectures due to differing memory models and lack of OS support. Even if feasible, this porting and verification effort would entail a large amount of effort.

Another approach is to use a dynamic translation system to translate a legacy guest ISA into a host parallel ISA for execution in a parallel architecture. Reconfigurable parallel architectures enable new parallel applications to take advantage of the parallel architecture, while maintaining compatibility with legacy industry-standard applications using dynamic translation.

One portion of a dynamic translation system for executing guest instructions on the host system is a translator for translating the guest instructions into host instructions. It is useful to be able to remove the cost of translation from the critical path of a computation. In a speculative parallel translation approach, described in more detail below, the translator traverses a program's possible execution paths and translates the corresponding basic blocks before the basic blocks are (potentially) needed in parallel with execution of previously translated basic blocks.

A basic block is sequence of instructions without jump or branch instructions, and corresponds to a vertex in a program control flow graph. For example, a sequence of instructions forms a basic block if, under any possible program execution order, the instructions in the basic block execute in the sequence order with no other instruction executing between two instructions in the sequence. From one basic block, one or more subsequent basic blocks can be determined based on branch target addresses associated with branch instructions.

This speculative parallel translation removes the cost of translation from the execution of a program because the translation cost of future basic blocks is overlapped with the execution of the current block. In some cases, a speculatively translated basic block may end up not being executed. This technique can also be applied to various types of multi-issue architectures including superscalar processors, for example, in the form of more aggressive decoding into a larger trace-cache or code cache like structure.

In a tiled integrated circuit architecture, spatial pipeline parallelism, described in more detail below, is based on coarsely pipelining computations across multiple tiles (e.g., in some cases across neighboring tiles). The dynamic translation system can exploit this form of parallelism, for example, by spatially pipelining a memory subsystem, code cache access, or any other functional subsystem.

The dynamic translation system can use either or both of static and dynamic virtual architecture reconfiguration. Static reconfiguration is used to reconfigure computational resources of a "virtual processor" (e.g., a processor whose functional modules are implemented in processor cores of a multi-core integrated circuit such as a tiled integrated circuit) before program execution, taking into account that different programs have different characteristics in terms of working set size, amount of ILP, and amount of instruction bandwidth. On a non-virtual processor (e.g., a single-core processor), an architect chooses one configuration for the processor at design time, while in a virtual processor different machine configurations can be chosen to fit a particular program's needs.

Dynamic reconfiguration is used to reconfigure computational resources of a virtual processor during execution of a program. For example, the dynamic binary translation system provides a virtual processor for a guest ISA by translating instructions of a guest program into host instructions that can run natively in at least one of the processors of a host integrated circuit. At startup none of the guest program has been translated; therefore, the virtual processor may dedicate all of its computation resources to a translator that performs decoding/translation of guest instructions. After the guest instruction working set has been translated, those computation resources can be reallocated for other uses. One use may be if the program hits a high ILP portion of the program. A reconfiguration manager running in the virtual processor can detect this and reallocate computation resources to provide more computation units according to the amount of ILP. Then if the program hits a phase where it needs more cache, the reconfiguration manager can reallocate some of its resources for more on-chip cache, etc. This dynamic reconfiguration technique allows the virtual processor to introspectively examine its own configuration along with the needs of the dynamic instruction stream and reconfigure itself at runtime.

To illustrate these techniques, described below is an exemplary parallel dynamic translation system. The exemplary translation system uses x86 Linux as the guest ISA and operating environment and executes instructions translated in to a Raw ISA on a Raw tiled integrated circuit host. The Raw host architecture is significantly different than the guest x86 architecture. For example, a different ISA, lack of memory translation, lack of protection, lack of condition codes, and lack of a hardware instruction cache on Raw are some of the aspects that the exemplary translation system can be configured to handle in a software dynamic translation environment. To mitigate this mismatch in architectures, the exemplary translation system exploits the parallel resources found on the Raw processor to accelerate binary translation. Optionally, additions to the Raw hardware can be made to improve the performance of Raw running x86 binaries.

The techniques described herein can be implemented for a variety of types of instructions set and hardware architectures. For example, implementations can provide translation for instruction set architectures such as PowerPC®, SPARC®, x86, PowerPC®, SPARC®, Alpha®, ARM®, ARC®, Sharc® DSP, TI®DSP, MIPS®, Java® bytecode, or MSIL® (Microsoft® Intermediate Language) ISAs, or can be configured to provide translation for any of multiple different ISAs. Some implementations are configured to translate instructions for a given type of processor architecture, such as a pipelined, VLIW, multithreaded, or superscalar processor.

3.1 Exemplary Dynamic Translation System

Since the exemplary dynamic translation system operates in a parallel environment, the cost to optimize blocks of translated code is less than in a non-parallel translation system. In a parallel environment, optimization can be performed in the background on processing resources that might otherwise be left idle, and thus, processor time that is used to perform an optimization does not necessarily steal cycles from the critical path of the program.

Figure 5A:
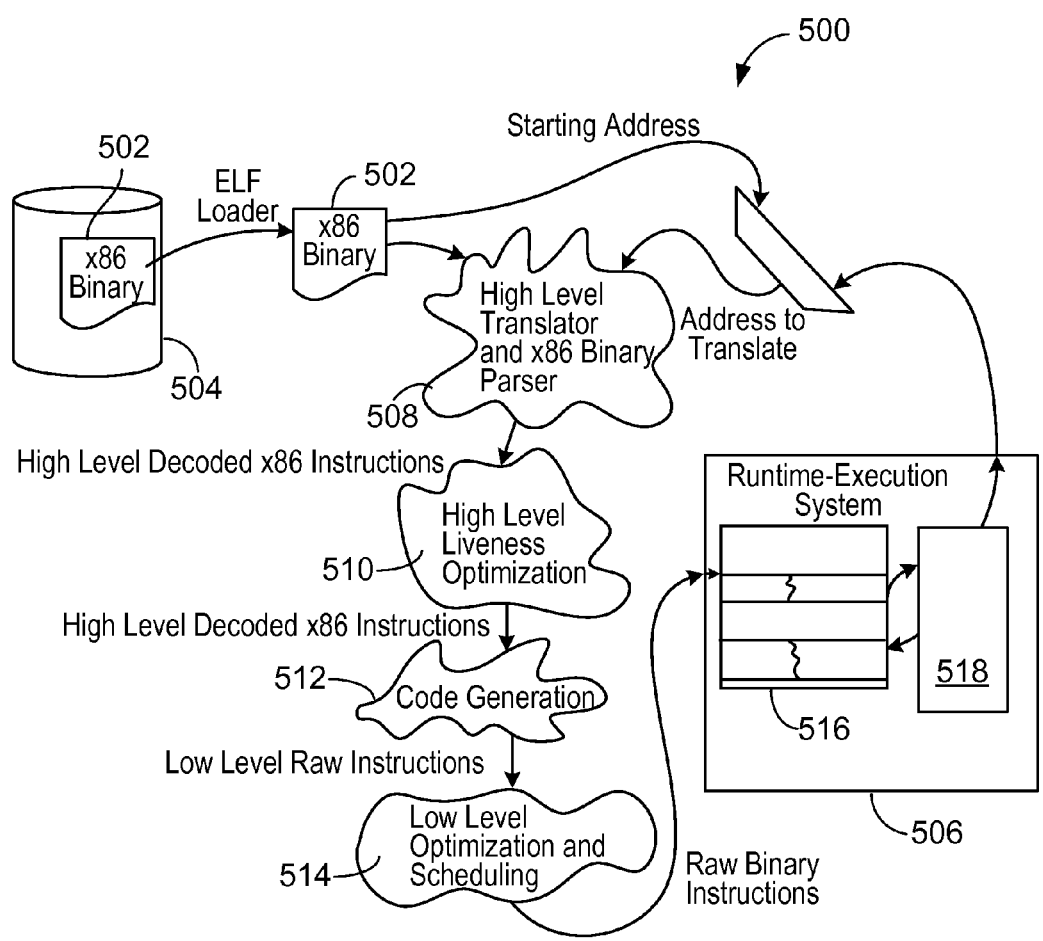
FIG. 5A is a schematic diagram of an exemplary translation system.

FIG. 5A shows a logical view of the exemplary translation system 500 showing a path that a guest program 502, an x86 binary, may take from being on disk 504 to being executed by a runtime-execution system 506. The program 502 is stored on the disk 504 in an executable binary format such as an executable and linking format (ELF). An ELF loader then loads and parses the ELF binary headers of the program 502, copies the program 502 into memory, relocates certain portions of the program 502 such as static data, and then zeros out the BSS section of memory corresponding to the program's needs. Then the ELF loader determines the program's entry point and passes this program address into a high level translator 508. The high level translator 508 proceeds to parse the x86 binary form of the program 502 and decodes instructions to construct a high level intermediate representation (IR) of instructions in the initial basic block of the program 502. The high level IR is similar to standard x86 operations, with some differences. For example, memory operations are decoupled from ALU operations in the high level IR. An optional high level optimizer 510 can apply a first pass of optimizations to the high level IR instructions. For example, the optimizations can include inter basic block flag analysis and intra basic block liveness analysis. Also, the high level optimizer 510 can perform register allocation. A code generator 512 receives the (optionally optimized) high level IR instructions and generates one or more low level Raw instructions for each remaining high level IR instruction. (The optimization may remove some of the initial high level IR instructions.) A low level optimizer 514 applies low level optimizations and schedules low level instructions corresponding to a basic block.

The generated and scheduled low level instructions for the basic block are passed to the runtime-execution system 506. The runtime-execution system 506 stores the instructions into a code cache 516 in instruction memory from which the instructions are executed. A tag identifying an address associated with the basic block is added to a tag set 518 for the code cache 516 to record that this basic block is currently in the code cache 516. Using the speculative parallel translation technique described herein, while the runtime-execution system 506 is executing translated instructions from a basic block, the high level translator 508 and code generator 512 are able to proceed processing subsequent basic blocks for storage in the code cache 516.

After the basic block completes execution, the runtime-execution system 506 retrieves the next basic block by address. The runtime system checks the tags in the tag set 518 to determine whether the next basic block is in the code cache 516. If the next basic block is in the code cache, execution control is passed over to translated low level instructions in that basic block. Otherwise, the runtime-execution system 506 requests that the high level translator 508 begin translating at the corresponding address.

Other optimizations include chaining once instructions are in the code cache 516. Chaining reduces the frequency of accesses to the code cache tags by directly patching a control transfer between two basic blocks if they both coexist in the final level of the code cache 516. This decreases the number of accesses to code cache tags and reduces the number of calls into the runtime-execution system 506.

Figure 5B:
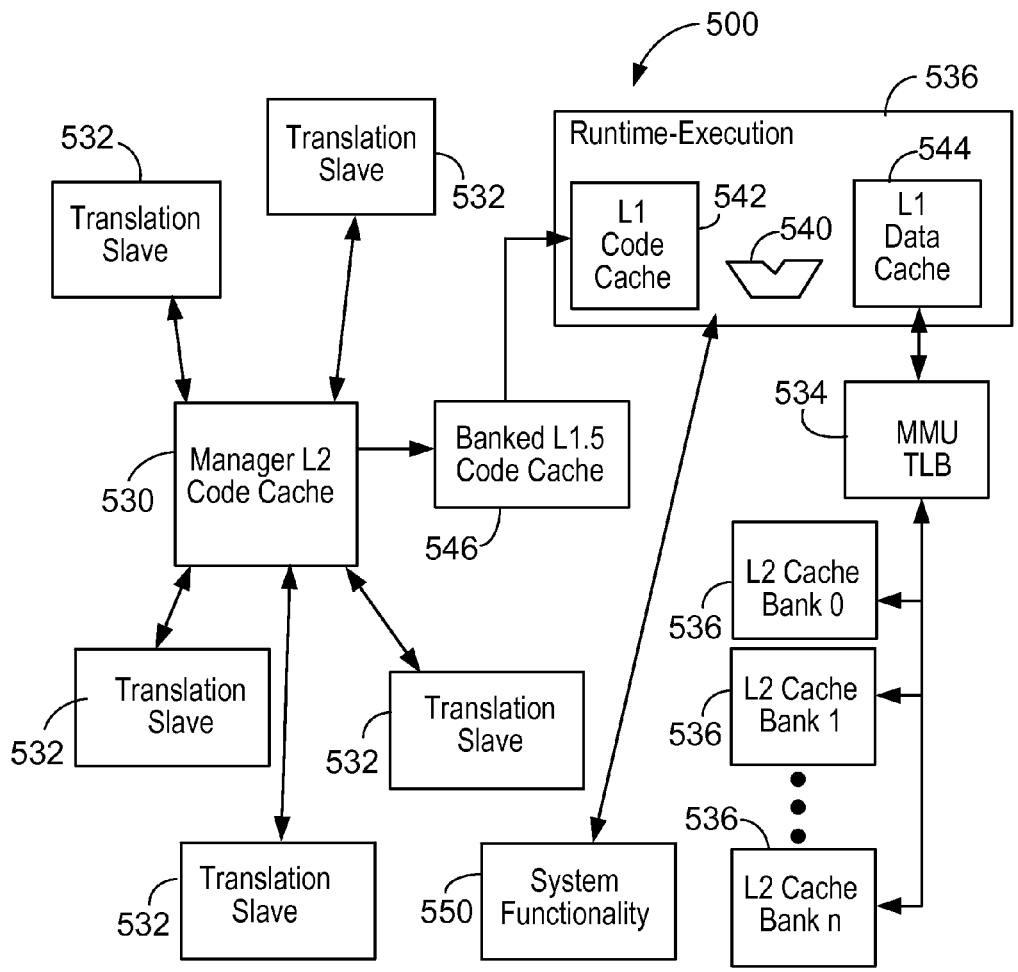
FIG. 5B is a block diagram of functional modules of the translation system.

Referring to FIG. 5B, a block-level view of the translation system 500 includes functional modules that can be implemented in different processors of a reconfigurable parallel system with multiple interconnected processors. In some implementations each functional module can be implemented in a single processor to perform a corresponding function. In some implementations, a set of multiple processors can perform a function, for example, cooperatively (e.g., one instance of a functional module temporally multiplexed across multiple tiles), or in parallel (e.g., multiple instances of a functional module running on different tiles), or time multiplexed (e.g., multiple functional modules multiplexed on a single tile). In some implementations, a single processor can be in more than one of the sets to perform the corresponding functions multiplexed in time. The functional module in the translation system 500 are described below in an example in which functional modules are implemented in tiles of a tiled integrated circuit.

3.1.1 Manager and L2 Code Cache

A manager tile 530 orchestrates the assignments of translating different portions of the guest program in parallel to translation slave tiles 532 and maintains a code cache of previously translated basic blocks. The manager tile 530 maintains one or more work lists of the addresses of basic blocks that are to be translated in the future. These work lists get generated at runtime as the program progresses and include the addresses of the starting points of basic blocks that have yet to be translated. Work is enqueued on these work lists when translation slave tiles 532 determine a possible branch target for the current basic block that they are translating. The manager tile 530 can maintain different priority levels of work queues to determine which basic block is the most critical and will be translated next.

The manager tile 530 uses a stateless, transactor style, model and assigns work (one or more basic blocks to be translated) to the translation slave tiles 532 via dynamic network messages. Subsequent work is assigned to a translation slave tile 532 whenever the slave tile finishes its current work. Also, the manager tile 530 controls the reconfiguration of the virtual microarchitecture of the translation system 500, including the number of tiles assigned to function as translation slave tiles 532.

Additionally, the manager tile 530 can store translated blocks to provide an L2 code cache for previously translated basic blocks. The L2 code cache is backed by an off-chip memory that is accessed over the dynamic network through a memory controller interface upon a cache miss. The runtime-execution tile 536 (implementing the runtime-execution system 506) includes an L1 code cache 542 that sends requests to the L2 code cache upon a cache miss. Optionally, one or more tiles can be used to provide an L1.5 code cache 546 between the L1 code cache 542 and the L2 code cache. The translation slave tiles 532 can send translated basic blocks to the manager tile 530 for storage at the appropriate cache level(s) (according to the cache update policy used), or alternatively, the translation slave tiles 532 can use a decentralized approach to store basic blocks into a corresponding memory location without necessarily interacting with the manager tile 530 when they finish translating a block. The translation slave tiles 532 enable both "spatial pipeline parallelism" and "computational parallelism." Spatial pipeline parallelism can be used to pipeline different functional modules of a virtual processor across a substrate of interconnected computation units. For example, a first functional module (e.g., a translation slave tile 532) executes a process to perform a first function (e.g., instruction translation) associated with one instruction from a program, while a second functional module (e.g., the runtime-execution tile 536) executes a process to perform a second function (e.g., an ALU operation) associated with a previous instruction from the program. Computational parallelism can be used to execute multiple processes in respective computation units (e.g., translation slave tiles 532) to perform the same function (e.g., translation) in the computation units in parallel for different portions (e.g., different basic blocks) of the program.

Other implementations, instead of a manager tile 530 managing multiple translators, include a single translator (running on one or more tiles) translates basic blocks in parallel with execution in the runtime-execution system of other basic blocks (spatial pipeline parallelism), but do not necessarily include parallel translation of multiple basic blocks (computational parallelism).

3.1.2 Translation Slave

Each translation slave tile 532 is configured to translate basic blocks of guest instructions into basic blocks of host instructions, for example, by performing the functions of high level translation, high level optimization, code generation, low level optimization, and scheduling, as described above. Any of a variety of translation techniques and tools can be used to perform these functions. For example, the translation slave tile 532 can perform high level translation to generate an intermediate representation using the x86 parser of the Valgrind memory debugger described by N. Nethercote and J. Seward in "Valgrind: A program supervision framework," Electronic Notes in Theoretical Computer Science, vol. 89, no. 2, 2003, incorporated herein by reference.

After initial parsing of the guest x86 instructions, the intermediate representation resembles x86 code in that each operation still maintains the same semantics as in x86 code, except that complex instructions such as string moves and string compares are broken into smaller instruction loops, and memory accesses are broken away from being a portion of the instruction. Breaking the memory portion of an instruction away from the arithmetic portion of an instruction helps to enable the translation system to operate on the instruction stream. At this stage in the translation, the exit points of a basic block are known and these exit points are conveyed to the manager tile 530 so that other translation slave tiles 532 can start translating the corresponding basic blocks without waiting for code generation on the current block to complete. After high level translation, the high level IR can be optimized and inter-block flag analysis can be performed. Inter-block flag analysis includes performing a high level translation on the following basic blocks and propagates which flags are dead into the current basic block's dead flag elimination routine. After inter-block flag analysis, the high level IR is register allocated.

The high level IR then reaches the code generation phase where the translation slave tile 532 performs initial code generation to Raw instructions. These instructions are then optimized at a low level and scheduled before being sent to the manager tile's L2 code cache, and possibly the runtime-execution tile 536 if the runtime-execution tile is waiting for that basic block to be translated. The manager tile 530 uses a coarse, thread-level parallelization to distribute basic blocks to translation slaves 532, for example, with each translation slave receiving one basic block to translate.

3.1.3 Memory Management Unit

A memory management unit (MMU) tile 534 is a tile programmed to provide an MMU function for the guest architecture. The MMU tile 534 performs address translation from x86 virtual addresses to x86 physical addresses to Raw physical addresses. This two-step address translation enables the MMU tile 534 to sandbox the x86 address space inside of the Raw address space. The MMU tile 534 accesses the Raw addresses from a bank of L2 data cache tiles 536.

The MMU tile 534 is able to emulate in software an x86-compatible architecture that contains address virtualization and protection on an architecture that does not necessarily have hardware support for such features (in this example, the Raw architecture). This level of software address translation can be quite expensive from a performance perspective. To speed this translation up, a software translation look-aside buffer (TLB) can be implemented on the MMU tile 534. This turns the hit case into a single load from a table versus multiple loads and parsing of the multi-level page tables that x86 uses. The page tables referenced by the TLB are maintained in standard x86 format and get read only on the miss case of the TLB. Most or even all of the on-tile memory of the MMU tile 534 can be used to store the TLB. This allows, for example, for an 8192 entry direct mapped TLB. Some processors that include a hardware TLB contain highly associative TLB's with very few entries. In some cases, when implementing software versions of hardware structures, better performance can be achieved by using a larger direct mapped TLB since associative lookups in software can be quite expensive due to the lack of specialized content addressable memory. In some cases, the host processor architecture may include a hardware TLB, which can be used for the TLB.

3.1.4 Runtime-Execution System

The runtime-execution system 506 includes a runtime-execution engine 540, the L1 code cache 542, and an L1 data cache 544. In this example, the runtime-execution system 506 is implemented in a single tile 536 and the runtime-execution engine 540 is the processor of the tile 536, and the L1 code cache 542 and L1 data cache 544 are both stored in an on-tile memory coupled to the processor. In other examples, any number of tiles can be used (e.g., using separate tiles for the runtime-execution engine, L1 code cache, and/or L1 data cache). The runtime-execution engine 540 executes the Raw instructions generated from the translated x86 basic block instructions. The runtime-execution engine 540 uses a dispatch loop, along with tags of the tag set 518 that are arranged as a direct mapped hash table. The dispatch loop takes the address of the next needed basic block and looks it up in the tag set 518. If it exists in the tag set 518, it is already in the L1 code cache 542 and control is transferred to this next basic block. If there is a miss in the tag set 518, the next level of the code cache is consulted for the next basic block of translated code (e.g., the L1.5 code cache or the L2 code cache). When the next basic block is returned, it is copied into the L1 code cache 542, an entry is added to the tag set 518, and control is transferred to this next basic block. Chaining can be implemented on cache hits as follows. When one basic block jumps to another basic block already in the L1 code cache 542, the branch is patched such that it bypasses the lookup in the tag set 518 and instead jumps directly to the basic block needed. The L1 code cache 542 uses a tight packing mechanism with the use of a high water pointer. When the L1 code cache 542 becomes full, the L1 code cache is completely flushed. In some implementations, chaining occurs once the code is stored into the L1 code cache 542, and is not maintained between flushes.

Also located on the runtime-execution tile 536 is the L1 data cache 544. The L1 data cache 544 is a virtually indexed, virtually tagged cache. Alternative implementations do not include an L1 data cache and instead access memory addresses from the L2 data cache tiles 536 through the MMU tile 534. In this example, the L1 data cache 544 is virtually addressed and has a virtual size of 64 KB and a physical size of 32 KB, which means some of the addresses spill to an off-tile (or off-chip) memory. The tags in the tag set 518 are stored in the switch instruction memory of the runtime-execution tile 536. Because the L1 data cache 544 is virtually addressed, it does not require a translation on every access. The L1 data cache 544 is a write back cache system with a block size of 64 bytes.

3.1.5 L2 Data Cache

A configurable number of L2 data cache tiles 536 can be assigned by the MMU tile 534 in cooperation with the manager tile 530 according to a dynamic virtual architecture reconfiguration scheme. As described in more detail below, tiles can be reconfigured during execution to perform different functions based on characteristics associated with executing the translated instructions. The L2 data cache tile 536 serve as an on-chip storage location, and receive memory access messages over the static or dynamic network from the MMU tile 534. The address to be accessed has already been translated into a Raw physical address by the MMU tile 534, and the L2 data cache tile 536 uses this Raw physical address to perform a load or store operatoin. The L2 data cache tiles 536 are able to handle unaligned memory accesses, as supported by the x86 memory system.

3.1.6 Banked L1.5 Code Cache

Optionally, one or more tiles can be used to provide an L1.5 code cache 546 between the L1 code cache 542 and the L2 code cache in the manager tile 530. In this example, two tiles dedicate their switch instruction memory, 64 KB each for a total of 128K, to be used as an L1.5 code cache. Each tile's 32 KB data cache memory is used to store tags for this cache. The runtime-execution tile 536 queries the L1.5 code cache 546 tiles before requesting a basic block that missed in the L1 code cache 542 from the L2 code cache in the manager tile 530. In this example, the L2 code cache is stored in a 32 KB on-chip memory in the manager tile 530, and is backed by an off-chip coupled memory that is 105 MB in size. Thus, the addition of the 128 KB of on-chip L1.5 code cache 546 and the fact that these two tiles are dedicated to servicing L1 code cache 542 misses can potentially improve performance significantly on applications that miss in the L1 code cache often.

3.1.7 System Related Functions

One tile in this example is dedicated to system related functions. The system tile 550 is responsible for starting up the translation, initializing the beginning page table layout, and contains the ELF loader. After the initial startup, the system tile 550 services system call requests. The system 500 is able to execute binaries that are statically linked with a C language library (e.g., newlib's libc library). In these cases, the bulk of the standard library's calls can be executed as translated x86 code on the runtime-execution tile 536. When system I/O is performed (e.g., in the form of a Linux level system call such as read, write, open, close, stat, fstat, brk, etc.) the runtime-execution tile 536 sends a message to the system tile 550 requesting that a system call be completed, and the runtime-execution tile 536 stalls. The system tile 550 then performs the appropriate parameter marshaling, data copying, and calls the equivalent Raw system's handler. These handlers in turn send dynamic network messages to a host Linux machine, for example, which then performs the requested I/O calls. The connection between the host Linux machine and the Raw system can be made via an appropriate interface (e.g., a USB 2.0 bridge). This allows for cross platform, cross architecture system calls to occur, and allows the system 500 to read any files available over NFS inside of the x86 translated code. After the system call completes, the results are marshaled back and a dynamic network message is sent to the runtime-execution tile 536 with the results, at which point the runtime-execution tile 536 unstalls. Executing system calls on a different tile than the runtime-execution tile 536 preserves the code present in the runtime-execution tile's L1 code cache 542. Alternatively, in other implementations, the runtime-execution tile 536 can perform system calls.

3.2 Optimizations

When a basic block of instructions is being translated on the translation slave tiles 532, the basic block may be optimized. For example, some of the optimizations that are performed may be optimizations that are typically performed inside of an optimizing compiler. The initial optimizations occur on the high level representation. At this level a liveness and dead code elimination pass can be applied to remove some of the redundancy right from the beginning. Subsequently, more redundancy can be removed if, for example, the representation is still in a two register form. Subsequently, flag analysis can be performed. To determine what flags a particular basic block needs to generate, the next two basic blocks are translated into their high level representations. The translation slave tile 532 determines an estimate of the live flags-in for each of the next two basic blocks. The union of the two sets of live flags-in for the next two basic blocks is taken and this is considered to be the live flags-out of the current basic block. A flag liveness pass can be used on the currently translated basic block to determine what instructions need to generate flags. Other flag computation can be removed. This form of aggressive flag generation can be used, for example, when attempting to execute guest instructions from an architecture that contains flags on a host architecture that lacks support for condition codes. Greater depth flag analysis can be used, but may not necessarily yield significantly improved results and may not be worth the extra cost to perform.

One form of low level optimization that can be applied to the low level instructions is value numbering. Value numbering is similar to common sub-expression elimination, yet it optimizes a slightly different set of cases. The translation slave tile 532 can also apply algebraic identities during value numbering to reduce redundancy. The translation slave tile 532 can also apply a copy propagation pass. Copy propagation replaces an input operand of an instruction with a different operand if it is able to prove that they are the same value. This reduces copies and the number of live values in a program. The translation slave tile 532 can also apply a dead code elimination pass on the instructions. Dead code elimination is a backwards pass on the program code and removes instructions whose outputs are not used or do not contribute to the output of a particular basic block.

The translation slave tile 532 schedules the optimized instructions. The tile 532 can use a cycle counting list scheduler, for example. This list scheduler computes a complete dataflow graph for a given basic block and then schedules the block trying to reduce the critical path through the block. The translation slave tile 532 is able to schedule useful operations while the processor would otherwise be stalled. Examples of instructions that can cause pipeline stalls are loads, multiplies, and divides.

3.3 Speculative Parallel Translation

Dynamic binary translators translate code from one ISA to another ISA at runtime. This can be quite expensive, especially for applications that either have a very short runtime or contain a large number of instructions that are executed infrequently. For long running programs that execute the same set of instructions frequently, techniques such as a code cache can amortize the cost of translation over many executions of a translated basic block. On sequential architectures, translation uses cycles that could otherwise be spent executing operations from the program. A parallel architecture does not need to take cycles away from the main program execution thread to perform translation. In a speculative parallel translation approach, the dynamic translation system uses parallel execution resources to translate at least some basic blocks in parallel with execution of previously translated basic blocks. The parallel resources to perform translation in parallel with execution are provided by spatial pipeline parallelism, as described in more detail below. With this approach, when the main execution thread reaches a portion of the program it has not previously executed, instead of necessarily stalling to wait for translation of that code, speculatively translated code may be available to be retrieved from the code cache and executed.

Using speculative parallel translation, the translator determines which code is appropriate to translate. One implementation is simply to traverse the program graph in control flow order. When a branch is reached, the translator spawns a new translation thread for each path that the program may take. Thus, the translator is doing speculative work, translating portions of the program that may or may not ever be executed. While it is possible that a large amount of the work that is done may not be needed with this approach, the parallel resources still contribute to potentially accelerating the main thread's execution.

One way to mitigate translating unneeded code sections is to use some form of prediction when a branch is reached to prioritize what is to be translated. Also, prioritization may accelerate the main thread's execution by not scheduling portions of code to be translated that may take away resources from sections of code that are critical to the program execution. Some techniques for prioritizing code to be translated may be similar to techniques used by a branch predictor with no previous branch information. Typically branch predictors use history information to determine which direction a branch should go. In this case, the translator is translating code before it is determined that the code will necessarily be executed. Thus, the translation system can use similar techniques as used by a first touch branch predictor. Some static heuristics can be applied in this situation such as predicting backward branches taken. The translation system can use static branch prediction along with a prioritized set of queues to determine what address should be translated next. The different levels of priority can be used to determine which address should be translated when the next translation slave 532 tile becomes free. When enqueuing, the priority can be determined by the depth the current basic block is from a piece of code that is known to be on the correct execution path of the program. Thus, as the basic block to be translated becomes more speculative, or further from the last known needed piece of code, the basic block is given a lower priority. The translated host instructions resulting from the speculative translations are stored in the appropriate level(s) of the code cache until they are needed.

In some cases, (e.g., for register indirect branches) the translator is not able to determine what address is the next appropriate address that the program may branch to until runtime. Typically, indirect branches come in the form of either function returns or calls through a jump table. For call returns, it is typically possible to determine the return address at call time. The translation system can use a call return predictor which adds the address after a call instruction onto a very low priority translation queue. The return address can be put on a low priority queue because the code inside of the function has a higher probability of being needed first than a call return point. For jump tables, without symbol information, it may not be possible to know what address may be called. In some implementations, the translation system does not speculatively translate beyond unresolvable register indirect jumps.

Speculative parallel translation can be applied to other forms of translation. For example, some processors that execute x86 code translate or decode instruction streams into micro-operations that are later executed. Some of the x86 instructions can be decoded and stored before it is determined that those instructions will necessarily be executed (as micro-operations).

Some dynamic translators employ some form of "hot spot optimization." Hot spot optimization detects the most frequently used or "hot" portions of a program and only optimizes those portions of the program. This form of optimization can be used to prevent using precious execution cycles from the main thread of control for optimizing code that is seldomly run. With speculative parallel translation, because the translation is removed from the critical path of the program's execution, expensive optimizations can be applied at translation time using parallel resource without necessarily reducing the number of cycles used for the main thread. Hot spot optimization can also be used in combination with speculative parallel translation to selectively apply certain optimizations at translation time.

3.4 Spatial Pipeline Parallelism

One form of parallelism that can be exploited in a parallel processing environment such as a tiled integrated circuit is pipeline parallelism. In a dynamic translator there are some functions that may not exhibit thread or data level parallelism. Spatial pipeline parallelism allows for the exploitation of parallelism in a different manner. Pipelining can also increase the throughput of a resource. For example, the translation system can implement a memory system on multiple tiles in a pipelined manner. When a memory access request is made, the access request is first passed to the MMU tile 534 for address translation and then onto the corresponding L2 data cache tile 536. While this memory access request is being serviced, the processor on the runtime-execution tile 536 is free to execute other non-dependent work (i.e., work that does not depend on a result of the access request). When pipelining across tiles, spatial pipelining takes into account wire delays to reduce latencies.

The exemplary translation system provides an example of pipelining sets of functional modules for performing different functions in a virtual processor across a substrate of processors in a tiled integrated circuit. This approach can be used to implement a complete out-of-order superscalar processor across many tens of tiles. Sets of tiles can be ganged together to implement the front end translation function, after which the instructions pass to a centralized or distributed set of scheduling tiles. Then the instructions can be passed to tiles that perform renaming, and then to reservation station tiles that issue instructions to multiple execution unit tiles. Then the instruction results can be passed along to a set of tiles that implement a reorder buffer in software for instruction retirement. This form of spatial pipelining would effectively allow a parallel processor to be used to speed up the execution of sequential codes.

A virtual processor can be configured to emulate a guest ISA on a parallel substrate having multiple processor cores by running each of multiple host processes (each in a native host ISA) on a respective set of one or more processor cores. The host processes are spatially pipelined to pass results from one process to the next to execute the guest instructions.

For example, the processes can be selected to emulate a function performed in native hardware of the guest ISA, such as: an instruction issue function, a register rename function, execution unit, cache coherence engine, prefetch engine, branch prediction, a memory prefetcher, an instruction fetcher, an interrupt handler, a translation lookaside buffer, condition codes, instruction decode.

An example of mapping a selected set of these functions onto tiles of a virtual architecture is: a branch prediction instruction fetch tile, which pipelines its results into a decoding and translation tile, which pipelines its results into a register rename tile, which pipelines its results into an instruction issue tile. Other tiles performing other functions are also coupled to one or more of the tiles, such as tiles performing memory functions.

For example, one of the tiles modeling a memory fetcher communicates with a data cache tile using a dedicated interconnect communication channel. A process running on the memory fetcher tile sends a data word to the data cache tile over an interconnection channel, and waits over another interconnection channel for the result from the data cache tile. The process is able to directly read the data from the network as soon as that data becomes available.

3.5 Static and Dynamic Virtual Architecture Reconfiguration

One of the major design decisions that a computer architect grapples with is how to provision the silicon area that he or she has to work with. Even with a relatively small number of knobs that can be tweaked, there exists a large, exponential, number of different designs that can be created. With all of these different possible designs, the architect ultimately chooses some configuration of the resources and implements the configuration in circuitry on an integrated circuit. Typically the architect takes a representative cross section of the applications that the integrated circuit will execute and optimizes parameters such as cache size, fetch bandwidth, bandwidth to main memory, number of computation units, number of physical registers, etc. The parameters chosen may be optimal across the benchmark suite, but it is probable that they are not optimal for any one benchmark but rather they are a compromise. With a reconfigurable virtual architecture, the architect does not need to determine the layout and allocation of silicon resources before the integrated circuit is fabricated. Different virtual architectures can be created and tailored to best suit a particular application.

One approach is static virtual architecture reconfiguration. With static virtual architecture reconfiguration, many different virtual architectures can be implemented on top of a parallel computational substrate. In the exemplary translation system described above the substrate is a tiled integrated circuit, but other implementations may use a different type of a multi-core processor or chip-multiprocessor. The configuration of the virtual architecture determines the relative amount of computational resources dedicated to any one function. This reconfigurability frees the designer from designing only one architecture. This allows the reallocation of resources after an integrated circuit has been fabricated. The configuration of functional modules over the substrate can be selected based on a given program or type of program, before that program is executed (e.g., at compile time).

Another (potentially complimentary) approach is dynamic virtual architecture reconfiguration. Within any given program, it may be the case that at different portions of the program a different allocation of the computational resources may be preferable. Programs typically transition through multiple phases throughout their runtime. For example, in dynamic translation, when a program begins, the program has not been translated yet, thus most of the computational resources should be dedicated to translation. After a significant portion of the program has been translated, the program may need more computation units assigned to executing translated instructions because it has reached a highly parallel portion of its execution. Then the program may need to access memory often to store the computed results. With dynamic virtual architecture reconfiguration, a reconfiguration manager within the virtual architecture is able to detect this need for more memory access and allocate more computational resources for data cache, for example. If the program reaches an indirect branch the reconfiguration manager is able to assign more computational resources for translation. With dynamic architecture reconfiguration, a centralized reconfiguration manager can be used to make decisions about when to reconfigure. This manager introspectively analyzes the current configuration of the virtual machine, the dynamic instruction stream, and the needs of the dynamic instruction stream. Because this level of optimization is occurring at runtime, the reconfiguration manager can take advantage of information that can only be determined accurately at runtime. The reconfiguration manager can use information such as cache miss rates (for the instruction and/or data caches), the dynamic determination of actual instruction level parallelism (typically not determinable at compile time due to address aliasing), the number of basic blocks waiting to be translated, the dynamic bandwidth needed to access different levels of cache hierarchy, or any other dynamically introspective meta-data about the program.

In some cases, reconfiguring computational resources based on instruction level parallelism characterizing the instructions includes assigning more processor cores when a block of instructions includes data parallel instructions such as Single Instruction Multiple Data (SIMD) instructions (e.g., MMX or SSE instructions) or vector instructions. In these cases, the additional processor cores can perform more ALU or floating point operations in parallel according to the level of parallelism in the data parallel instructions to be executed.

Dynamic reconfigurability does come with some cost. When changing the virtual machine configuration, there is a cost associated with reconfiguration and a cost associated with monitoring. The reconfiguration metrics can be sampled at a predetermined rate to reduce the monitoring cost. An example of reconfiguration cost is the cost associated with changing the size of the L2 data cache (e.g., the number of tiles used for this function). When the L2 cache physically changes size, the contents of the L2 cache may need to be flushed and written back to main memory that may be located off-chip coupled to at least one tile. This flushing may be performed to preserve cache coherence and prevent reading incorrect data in the new cache configuration. Events like flushing of a cache can be quite expensive if they occur often, thus virtual architecture reconfiguration techniques have some hysteresis built into the system to prevent too frequent reconfigurations.

The exemplary translation system dynamically traded off the number of L2 data cache tiles 536 against the number of translation slave tiles 532. To determine when to reconfigure, the reconfiguration manager determined the length of the work queues of basic blocks to be translated. In other implementations, any of a variety of parameters can be used. The reconfiguration manager can have some hysterisis built in by reassigning tiles between the set of L2 data cache tiles 536 and the set of translation slave tiles 532 according to hysteresis characterizing a parameter such as the number of basic blocks waiting to be translated, or a data cache miss rate, for example.

Static and dynamic virtual architecture reconfiguration can be used to implement virtual multiprocessor systems. For example, a large tiled integrated circuit can be configured to run multiple virtual processors at the same time. This could provide an x86 server farm, or an x86 SMP, for example, built virtually on a single integrated circuit. If dynamic reconfiguration is then applied between virtual processors, the virtual processors would compete for resources and this would lead to a higher utilization of the computational resources of the underlying tiled integrated circuit. In an example of this, two virtual x86 processor's can be configured to share 16 tiles. If one of the x86 processors is stalled waiting on I/O while the other is performing computations, the stalled processor could be reduced down to one tile while the other processor could use the remaining 15 tiles to speed up its computations.

Various techniques can be used to improve system performance, including mapping ILP onto multiple functional units within a processor core (e.g., functional units of a VLIW processor).

A virtual architecture can provide partial or full system emulation. For example, in some implementations userland programs are emulated and system calls are handled with a proxy system call interface. Some implementations support booting a complete operating system such as Windows or Linux, including translation of system level instructions. Some implementations are able to support self modifying code by detecting writes to memory pages that contain code that has been translated, and flushing the code cache in response to detecting such writes.

Various features of the tiled integrated circuit architecture and programming described herein can be implemented by modifying versions of the tiled integrated circuits described in U.S. application Ser. No. 11/302,956, incorporated herein by reference, or in the following publications: "Baring It All to Software: RAW Machines" *IEEE Computer*, September 1997, pp. 86-93, "Space-Time Scheduling of Instruction-Level Parallelism on a Raw Machine," *Proceedings of the Eighth International Conference on Architectural Support for Programming Languages and Operating Systems (ASPLOS-VIII)*, San Jose, Calif., Oct. 4-7, 1998, "Raw Computation" *Scientific American*, August 1999, Vol. 281, No. 2, pp. 44-47, "The Raw Microprocessor: A Computational Fabric for Software Circuits and General Purpose Programs," *IEEE Micro*, March/April 2002, pp. 25-35, and "A 16-issue multiple-program-counter microprocessor with point-to-point scalar operand network," *Proceedings of the IEEE International Solid-State Circuits Conference*, February 2003, each of which is incorporated herein by reference.

Various techniques described herein can be implemented in additional types of integrated circuit architectures. For example, some techniques can be used in an integrated circuit in which multiple processor cores include respective computation units interconnected by a shared interconnection network such as a bus, or a pipelined bus, in addition to a tiled integrated circuit architecture in which multiple processor cores are interconnected by a network of switches connected to respective computation units.

It is to be understood that the foregoing description is intended to illustrate and not to limit the scope of the invention, which is defined by the scope of the appended claims. Other embodiments are within the scope of the following claims.

What is claimed is:

1. A method for processing instructions in an integrated circuit, the integrated circuit comprising a plurality of processor cores, the method comprising:

managing a plurality of sets of processor cores, each set including one or more processor cores assigned to a respective function associated with executing instructions of the same program to be executed on the integrated circuit, where at least a first set includes one or more processor cores assigned to a first function associated with preparing the instructions for execution, and at least a second set includes one or more processor cores assigned to a second function, performed in parallel with the first function, associated with executing the prepared instructions;

speculatively performing, by the first set of one or more processor cores, the first function on at least some instructions before it is determined that those instructions will be executed;

storing the results of performing the first function as the prepared instructions; and determining, by the second set of one or more processor cores, when reaching a portion of the program not previously executed, whether the first function has been speculatively performed on instructions for that portion of the program and the results of performing the first function have been stored as prepared instructions, with the second set of one or more processor cores retrieving the stored prepared instructions if prepared instructions were stored, and stalling to wait for the first set of one or more processor cores to perform the first function on instructions for that portion of the program if prepared instructions were not stored.

2. The method of claim 1, wherein the first function associated with the first set comprises translating instructions.

3. The method of claim 2, wherein translating the instructions comprises translating instructions of a guest instruction set architecture into instructions of a host instruction set architecture native to the processor cores.

4. The method of claim 3, wherein the guest instruction set architecture corresponds to an x86 instruction set architecture.

5. The method of claim 2, further comprising reserving at least one processor core in the first set for translating a block of instructions in response to a request from a processor core executing translated instructions.

6. The method of claim 2, further comprising preempting a processor core in the first set that is translating a first block of instructions in response to a request to translate a second block of instructions from a processor core executing translated instructions.

7. The method of claim 2, further comprising storing instructions translated by processor cores in the first set in a cache.

8. The method of claim 7, wherein storing instructions in the cache comprises storing the instructions in one of a plurality of processor cores providing memory for the cache.

9. The method of claim 2, wherein a third function associated with a third set comprises storing cached data.

10. The method of claim 1, wherein the first function associated with the first set comprises storing cached data.

11. The method of claim 10, wherein a memory management processor core translates virtual addresses associated with instructions to be executed into physical addresses to be handled by processor cores in the first set.

12. The method of claim 1, further comprising reconfiguring the number of processor cores assigned to at least one of the sets during execution of the program, including reassigning at least some of the processor cores from the first set to the second set based on a cache miss rate associated with executing the instructions.

13. The method of claim 12, wherein the cache miss rate is associated with a cache for instructions translated by processor cores in the first set.

14. The method of claim 12, wherein the cache miss rate is associated with a cache for data stored in processor cores in the first set.

15. The method of claim 1, further comprising reconfiguring the number of processor cores assigned to at least one of the sets during execution of the program, including reassigning at least some of the processor cores from the first set to the second set based on instruction level parallelism characterizing the instructions.

16. The method of claim 15, wherein reassigning processor cores comprises selecting a number of processor cores to execute a number of operations in parallel according to a data parallel instruction to be executed.

17. The method of claim 16, wherein the data parallel instruction comprises a single instruction multiple data instruction or a vector instruction.

18. The method of claim 1, further comprising reconfiguring the number of processor cores assigned to at least one of the sets during execution of the program, including reassigning at least some of the processor cores from the first set to the second set based on a quantity of work assigned to the processor cores in the first set.

19. The method of claim 18, wherein the quantity of work comprises a number of basic blocks of instructions waiting to be translated by the processor cores in the first set.

20. The method of claim 1, wherein at least one of the processor cores is in more than one of the sets to perform the corresponding functions multiplexed in time.

21. An integrated circuit, comprising:
a plurality of sets of processor cores interconnected by an interconnection network, each set including one or more processor cores assigned to a respective function associated with executing instructions of the same program to be executed on the integrated circuit, where at least a first set includes one or more processor cores assigned to a first function associated with preparing the instructions for execution, and at least a second set includes one or more processor cores assigned to a second function, performed in parallel with the first function, associated with executing the prepared instructions;
with the first set of one or more processor cores being configured to speculatively perform the first function on at least some instructions before it is determined that those instructions will be executed and store the results as the prepared instructions, and
with the second set of one or more processor cores being configured to determine, when reaching a portion of the program not previously executed, whether the first function has been speculatively performed on instructions for that portion of the program and the results have been stored as prepared instructions, and configured to
retrieve the stored prepared instructions if prepared instructions were stored, and
stall to wait for the first set of one or more processor cores to perform the first function on instructions for that portion of the program if prepared instructions were not stored.

22. The integrated circuit of claim 21, wherein a first set of processor cores comprises processor cores configured to execute host instructions to translate guest instructions into host instructions, the host instructions corresponding to a host instruction set architecture native to the processor cores.

23. The integrated circuit of claim 22, wherein at least one processor core is configured to access a cache for host instructions translated by processor cores in the first set.

24. The integrated circuit of claim 23, wherein the cache comprises memory in at least one processor core.

25. The integrated circuit of claim 23, wherein the cache comprises memory coupled to at least one processor core.

26. The integrated circuit of claim 21, wherein a first set of processor cores comprises processor cores, each configured to execute host instructions to store cached data in a memory within the respective processor core.

27. The integrated circuit of claim 26, wherein a memory management processor core includes a translation lookaside buffer to translate virtual addresses associated with instructions to be executed into physical addresses to be handled by processor cores in the first set.

28. The integrated circuit of claim 21, wherein each of the plurality of processor cores corresponds to a tile on the integrated circuit, each tile comprising:
a computation unit; and
a switch including switching circuitry to forward data received over data paths of the interconnection network from other tiles to the computation unit and to switches of other tiles, and to forward data received from the computation unit to switches of other tiles.

29. The integrated circuit of claim 28, wherein the computation unit comprises a pipelined processor and the switch is coupled to a plurality of pipeline stages of the pipelined processor.

30. The integrated circuit of claim 29, wherein at least one port of the switch is mapped to a register name space of the pipelined processor.

31. The method of claim 1, wherein the first set of one or more processor cores speculatively performs the first function on at least some instructions in parallel with the second set of one or more processor cores performing the second function associated with executing previously prepared instructions.

32. The method of claim 1, wherein the first set of one or more processor cores use branch prediction to prioritize an order in which to speculatively perform the first function on multiple sets of instructions that occur after a branch in the program.

33. The method of claim 32, wherein the order is based on a depth of a given set of instructions from a portion of the program that is known to be on a correct execution path of the program.

* * * * *